U S009609581B2

(12) United States Patent
Baghel et al.

(10) Patent No.: US 9,609,581 B2
(45) Date of Patent: Mar. 28, 2017

(54) PARAMETERS FOR DEVICE TO DEVICE DISCOVERY

(71) Applicant: QUALCOMM Incorporated, San Diego, CA (US)

(72) Inventors: Sudhir Kumar Baghel, Bridgewater, NJ (US); Shailesh Patil, North Wales, PA (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 14/556,996

(22) Filed: Dec. 1, 2014

(65) Prior Publication Data
US 2015/0208332 A1 Jul. 23, 2015

Related U.S. Application Data

(60) Provisional application No. 61/929,895, filed on Jan. 21, 2014.

(51) Int. Cl.
*H04W 48/16* (2009.01)
*H04W 76/02* (2009.01)
*H04W 36/00* (2009.01)
*H04W 8/00* (2009.01)
*H04W 36/14* (2009.01)

(52) U.S. Cl.
CPC ........... *H04W 48/16* (2013.01); *H04W 8/005* (2013.01); *H04W 36/0061* (2013.01); *H04W 76/023* (2013.01); *H04W 36/14* (2013.01)

(58) Field of Classification Search
CPC . H04W 48/16; H04W 8/005; H04W 36/0061; H04W 76/023; H04W 36/14
See application file for complete search history.

(56) References Cited

U.S. PATENT DOCUMENTS

| | | | |
|---|---|---|---|
| 2013/0083779 A1 | 4/2013 | Ahn et al. | |
| 2013/0310103 A1* | 11/2013 | Madan | H04W 52/242 455/522 |
| 2014/0056220 A1* | 2/2014 | Poitau | H04W 40/246 370/328 |
| 2014/0204898 A1* | 7/2014 | Yang | H04W 8/005 370/330 |
| 2014/0242963 A1* | 8/2014 | Novlan | H04W 48/16 455/418 |

(Continued)

OTHER PUBLICATIONS

3GPP, "3rd Generation Partnership Project; Technical Specification Group Radio Access Network; Synchronisation in UTRAN Stage 2 (Release 11)", 3GPP TS 25.402, v11.0.0 (Sep. 2012), Technical Specification, Sep. 2012, pp. 1-51, 3rd Generation Partnership Project, Valbonne, FR.

(Continued)

*Primary Examiner* — Duc C Ho
(74) *Attorney, Agent, or Firm* — Holland & Hart LLP

(57) ABSTRACT

A user device may receive one or more parameters from a base station to facilitate device-to-device (D2D) discovery. One of the received parameters is a discovery period parameter, which identifies a discovery period in which discovery resources are available for D2D discovery. Once the user device has received the parameters, the user device may use the parameters to participate in D2D discovery.

29 Claims, 16 Drawing Sheets

(56) References Cited

U.S. PATENT DOCUMENTS

2014/0301289 A1* 10/2014 Johnsson ............ H04W 76/021
                                                                370/329
2015/0043483 A1*  2/2015 Sartori ................. H04W 72/02
                                                                370/329
2016/0050624 A1*  2/2016 Tirronen ........... H04W 52/0216
                                                                370/311

OTHER PUBLICATIONS

ISA/EPO, Partial International Search Report of the International Searching Authority, Int'l. App. No. PCT/US2014/067998, Mar. 26, 2015, European Patent Office, Rijswijk, NL, 6 pgs.

Qualcomm Incorporated, "Techniques for D2D Discovery," 3GPP TSG-RAN WG1 #73, May 20-24, 2013, Fukuoka, JP, R1-132503, URL: http://www.3gpp.org/ftp/tsg_ran/WG1_RL1/TSGR1_73/Docs/, 3rd Generation Partnership Project, 7 pgs.

ISA/EPO, International Search Report and Written Opinion of the International Searching Authority, Int'l. App. No. PCT/US2014/067998, May 22, 2015, European Patent Office, Rijswijk, NL, 17 pgs.

* cited by examiner

| Information Elements | |
|---|---|
| Discovery Parameters | Discovery Period Parameter 305 |
| | SFN Extension Parameter 310 |
| | Discovery Offset Parameter 315 |
| | Discovery Subframes Parameter 320 |
| | Discovery RB Length Parameter 325 |
| | Discovery RB Start and End Point Parameters 330 |
| | Modulation and Coding Parameters 335 |
| | Position of Synchronization Signal Parameter 340 |
| | Transmission Power Parameter 345 |
| | Allowed Mode of Operation Parameter 350 |
| | Common or Dedicated Discovery Resources Parameter 355 |
| | Transmission Resource Selection Method Parameter 360 |
| | DMRS Usable Cyclic Shifts Parameter 365 |
| | Other Parameters 370 |

FIG. 3

PARAMETERS FOR DEVICE TO DEVICE DISCOVERY

CROSS REFERENCES

The present Application for Patent claims priority to U.S. Provisional Patent Application No. 61/929,895 by Baghel et al., entitled "Parameters for Device to Device Discovery," filed Jan. 21, 2014, and assigned to the assignee hereof

BACKGROUND

Field of the Disclosure

Wireless communications systems are widely deployed to provide various types of communication content such as voice, video, packet data, messaging, broadcast, and so on.

Description of Related Art

Wireless communications systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. Generally, a wireless multiple-access communications system may include a number of base stations, each simultaneously supporting communication for multiple user devices. Base stations may communicate with user devices on downstream and upstream links. Each base station has a coverage range, which may be referred to as the coverage area of the base station or cell.

User devices that are proximate to each other may also communicate directly via device-to-device (D2D) communication. In order to do so, however, a user device first discovers the other user devices that are within range for D2D communication. The process of D2D discovery allows a user device to transmit a discovery signal so as to announce that the user device is available to be discovered. Additionally, the user device receives and decodes discovery signals from other user devices that are within range. However, in order for a D2D transmission to be received and decoded, the receiving user devices may need to have an understanding of the timing and method by which the transmitting user device is broadcasting its discovery signal.

SUMMARY

The described features generally relate to one or more improved methods, systems, or apparatuses for managing wireless communications. As an example, a first method for wireless communications is described. In one configuration, a user device receives from a base station one or more parameters enabling D2D discovery. One of the received parameters is a discovery period parameter, which identifies a discovery period in which discovery resources are available for D2D discovery. Once the user device has received the parameters, the user device uses the parameters to participate in D2D discovery.

According to a first set of illustrative embodiments, a method for wireless communications may include receiving at a user device a plurality of parameters for device-to-device discovery, where the plurality of parameters including a discovery period parameter identifying a discovery period in which discovery resources are available for device-to-device discovery. The method may also include using the plurality of parameters in order to participate in discovery with other user devices. In some examples, the discovery period is a fraction or a multiple of a maximum system frame number (SFN) of a network in which the user device is used. When the discovery period is a multiple of a maximum SFN, the plurality of parameters may further include an SFN extension parameter to indicate a number of times the maximum SFN is exceeded during the discovery period.

In certain examples, the plurality of parameters may further include a discovery offset parameter indicating an offset between a start of the discovery period and a fixed time-based reference point for both transmission and reception pools. In some examples, a neighbor reception pool offset may also be indicated with respect to the fixed reference point of a serving cell. In other examples, the plurality of parameters may further include a discovery subframes parameter indicating which subframes within the discovery period are available as discovery resources. The discovery subframes parameter may be a bit map. Additionally, the plurality of parameters may further include a discovery resource block (RB) length parameter indicating a number of RBs to be used for each discovery signal within a subframe available as a discovery resource. Further, the plurality of parameters may further include discovery RB start and end point parameters indicating a start point and an end point of a number of resource blocks to be used for each discovery signal within a subframe available as a discovery resource.

In certain examples, the plurality of parameters may further include modulation and coding parameters indicating a modulation and coding scheme for discovery signal transmission. In other certain examples, the plurality of parameters may further include a position of synchronization signal parameter indicating a position of a synchronization signal of a base station as forwarded each discovery period by one or more user devices connected to the base station.

In certain examples, the plurality of parameters may further include a transmission power parameter indicating a power level for discovery signal transmission. The transmission power parameter can be a plurality of transmission power parameters when resources used for discovery are partitioned into different power zones. Each of the plurality of transmission power parameters may be associated with a corresponding power zone and have an associated bit map indicating subframes used for discovery signal transmission at the respective power level.

In certain examples, the plurality of parameters may further include an allowed mode of operation parameter indicating whether discovery can occur during a connected mode or an idle mode. The plurality of parameters may further include a common discovery resource pool parameter or a dedicated discovery resource pool parameter indicating whether discovery resources are common to user devices or whether discovery resources are dedicated to specific user devices. The common or dedicated discovery resource pool parameter may be a bit map indicating start and end points of common and dedicated discovery resources when the discovery resources are frequency-domain multiplexed (FDM). Alternatively, the common discovery resource pool parameter is a first bit map indicating common discovery resources and the dedicated discovery resource pool parameter is a second bit map indicating dedicated discovery resources when the discovery resources are time-domain multiplexed (TDM).

In certain examples, the plurality of parameters may further include a transmission resource selection method parameter indicating a method to be used by the user device for selecting which of the available discovery resources is to be used for discovery signal transmission. In certain other examples, the plurality of parameters may further include a demodulation reference signal (DMRS) usable cyclic shifts parameter indicating which DMRS cyclic shifts are available as well as a time-varying pattern of DMRS shift.

In certain examples, some of the plurality of parameters are different based on a class of the user devices. For example, the plurality of parameters includes two or more of a system frame number (SFN) extension parameter, a discovery offset parameter, a discovery subframes parameter, a discovery resource block length parameter, discovery resource block start and end point parameters, modulation and coding parameters, a position of synchronization signal parameter, a transmission power parameter, an allowed mode of operation parameter, a common discovery resource pool parameter, and a dedicated discovery resource pool parameter. The class of the user device may be one of commercial or public safety.

In certain examples, the discovery period parameter is different for different classes of user devices. The plurality of parameters may further include one or more discovery offset parameters for the different classes of user devices, the discovery offset parameters each indicating an offset between a start of a respective discovery period and a fixed time-based reference point. In some examples, the discovery offset parameters indicate an offset between the start of the respective discovery period and the fixed time-based reference point for both transmission and reception pools. In some examples, a neighbor reception pool offset may also be indicated with respect to a fixed reference point of a serving cell of the user device. The plurality of parameters may also further include one or more discovery resource block (RB) length parameters for the different classes of user devices, the discovery RB parameters each indicating a number of RBs to be used for each discovery signal within a subframe available as a discovery resource. The plurality of parameters may further include modulation and coding parameters indicating modulation and coding schemes for discovery signal transmission for each of the different classes of user devices.

In certain examples, the method for wireless communications may include performing a hashing operation using a system time and security key to encode the discovery with the other user devices. Further, the method may include receiving the system time as one of the plurality of parameters. The plurality of parameters may include a parameter indicating a number of discovery signal transmissions to be performed by the user device when discovery resources are dedicatedly provided to the user device. The plurality of parameters may also include a parameter indicating a number of empty discovery signal transmission after which the user device may determine that discovery resources previously dedicated to the user device are deallocated.

In certain examples, receiving the plurality of parameters further includes receiving some of the plurality of parameters on different frequencies in a system broadcast message. In other examples, receiving the plurality of parameters further includes receiving the plurality of parameters for different public land mobile networks (PLMNs) in a system broadcast message.

According to a second set of illustrative embodiments, an apparatus for wireless communications may include means for receiving at a user device a plurality of parameters for device-to-device discovery, the plurality of parameters including a discovery period parameter identifying a discovery period in which discovery resources are available for device-to-device discovery. The apparatus may also include means for using the plurality of parameters in order to participate in discovery with other user devices.

In certain examples, the means for receiving may include means for receiving an SFN extension parameter to indicate a number of times a maximum SFN is exceeded during the discovery period. In certain examples, the means for receiving may include means for receiving a discovery offset parameter indicating an offset between a start of the discovery period and a fixed time-based reference point. In certain examples, the means for receiving may include means for receiving a discovery subframes parameter indicating which subframes within the discovery period are available as discovery resources. The means for receiving may include means for receiving a discovery RB length parameter indicating a number of RBs to be used for each discovery signal within a subframe available as a discovery resource. The means for receiving may also include means for receiving discovery RB start and end point parameters indicating a start point and an end point of the RBs to be used for each discovery signal within a subframe available as a discovery resource.

According to another set of illustrative embodiments, an apparatus configured for wireless communications may include at least one processor and a memory coupled to the at least one processor. The at least one processor may be configured to receive at a user device a plurality of parameters for device-to-device discovery, the plurality of parameters including a discovery period parameter identifying a discovery period in which discovery resources are available for device-to-device discovery. The at least one processor may also be configured to use the plurality of parameters in order to participate in discovery with other user devices.

In certain examples, the processor may be further configured to receive an SFN extension parameter to indicate a number of times a maximum SFN is exceeded during the discovery period. In certain other examples, the processor may be further configured to receive a discovery offset parameter indicating an offset between a start of the discovery period and a fixed time-based reference point. The processor may be further configured to receive a discovery subframes parameter indicating which subframes within the discovery period are available as discovery resources. The processor may be further configured to receive a discovery RB length parameter indicating a number of RBs to be used for each discovery signal within a subframe available as a discovery resource. In other certain examples, the processor may be further configured to receive discovery RB start and end point parameters indicating a start point and an end point of the RBs to be used for each discovery signal within a subframe available as a discovery resource.

In certain examples, the plurality of parameters further includes a transmission power parameter indicating a power level for discovery signal transmission. In other examples, the transmission power parameter can be a plurality of transmission power parameters when resources used for discovery are partitioned into different power zones, each of the plurality of transmission power parameters being associated with a corresponding power zone and having an associated bit map indicating subframes used for discovery signal transmission at the respective power level.

According to another set of illustrative embodiments, a computer program product may include a non-transitory computer-readable medium having non-transitory program code recorded thereon. The non-transitory program code may include program code to receive at a user device a plurality of parameters for device-to-device discovery, the plurality of parameters including a discovery period parameter identifying a discovery period in which discovery resources are available for device-to-device discovery. The non-transitory program code may also include program code to use the plurality of parameters in order to participate in discovery with other user devices.

In certain examples, the program code may further include program code to receive an SFN extension parameter to indicate a number of times a maximum SFN is exceeded during the discovery period. In certain other examples, the program code may further include program code to receive a discovery offset parameter indicating an offset between a start of the discovery period and a fixed time-based reference point. Optionally, the program code may further include program code to receive a discovery subframes parameter indicating which subframes within the discovery period are available as discovery resources. In certain examples, the program code may further include program code to receive a discovery RB length parameter indicating a number of RBs to be used for each discovery signal within a subframe available as a discovery resource. The program code may further include program code to receive discovery RB start and end point parameters indicating a start point and an end point of the RBs to be used for each discovery signal within a subframe available as a discovery resource.

According to another set of illustrative embodiments, a method for wireless communications may include transmitting to a plurality of user devices a plurality of parameters for device-to-device discovery, the plurality of parameters including a discovery period parameter identifying a discovery period in which discovery resources are available for device-to-device discovery.

In certain examples, the discovery period may be a multiple of a maximum SFN, the plurality of parameters transmitted to the user devices further includes an SFN extension parameter to indicate a number of times the maximum SFN is exceeded during the discovery period. In other examples, the plurality of parameters transmitted to the user devices may further include a discovery offset parameter indicating an offset between a start of the discovery period and a fixed time-based reference point.

In certain examples, the plurality of parameters transmitted to the user devices may further include a discovery subframes parameter indicating which subframes within the discovery period are available as discovery resources. The plurality of parameters transmitted to the user devices may also further include a discovery RB length parameter indicating a number of RBs to be used for each discovery signal within a subframe available as a discovery resource. In certain examples, the plurality of parameters transmitted to the user devices may further include discovery RB start and end point parameters indicating a start point and an end point of the RBs to be used for each discovery signal within a subframe available as a discovery resource.

In certain examples, the method may include repeating the transmission of the plurality of parameters for different frequencies in a system broadcast message. Additionally, in certain examples, the method may include repeating the transmission of the plurality of parameters for different public land mobile networks (PLMNs) in a system broadcast message.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 is a block diagram of an example of a discovery system information block (SIB), in accordance with various embodiments;

DETAILED DESCRIPTION

Typically, user devices engage in wireless communications by communicating with a base station of a wireless communications system. However, users of user devices may also participate in D2D wireless communications. D2D wireless communications allow user devices that are within range of each other to communicate directly with each other instead of communicating through a base station. An example of when D2D wireless communications is desirable is when a user device leaves the coverage of a base station. In order to avoid an interruption in service, the user device which has left the coverage area may broadcast a peer discovery message, such as a Direct Peer-Discovery Signal in a Long Term Evolution (LTE) system, which may then be received by an in-coverage user device. Once the two user devices have discovered each other, the in-coverage user device may act as a relay between the out-of-coverage user device and the base station. Other uses of D2D wireless communications also exist. D2D wireless communications, however, may be dependent on the user devices discovering each other via a D2D discovery process. The D2D discovery process may be coordinated so that each user device is configured with sufficient parameters to discover other user devices.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
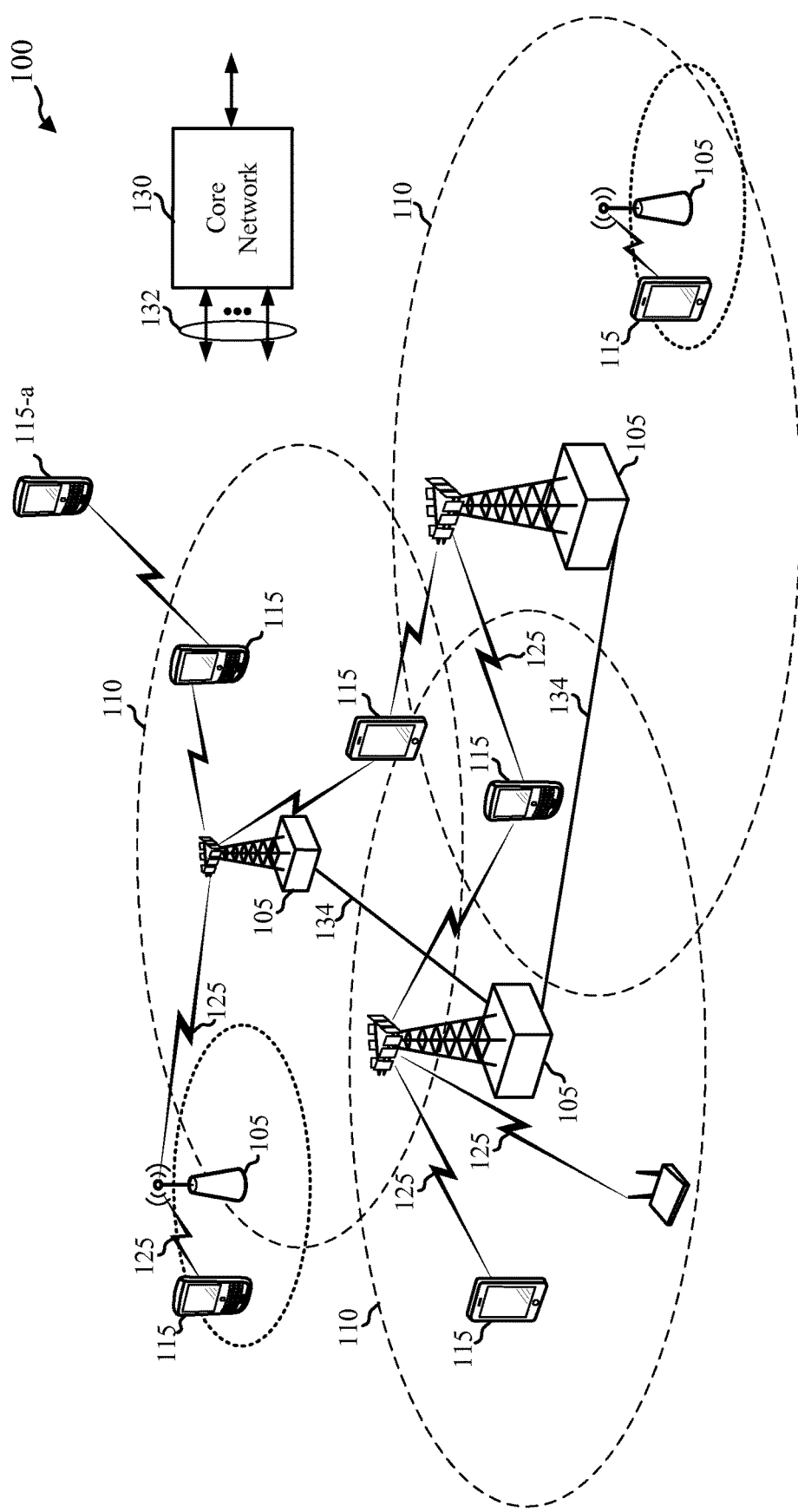
FIG. 1 is a block diagram of an example of a wireless communications system, in accordance with various embodiments.

Referring first to FIG. 1, a diagram illustrates an example of a wireless communications system 100. The wireless communications system 100 includes base stations (or cells) 105, communication devices 115, and a core network 130. The base stations 105 may communicate with the communication devices 115 under the control of a base station controller, which may be part of the core network 130 or the base stations 105 in various embodiments. Base stations 105 may communicate control information or user data with the core network 130 through backhaul links 132. In embodiments, the base stations 105 may communicate, either directly or indirectly, with each other over backhaul links 134, which may be wired or wireless communications links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, and the like.

The base stations 105 may wirelessly communicate with the user devices 115 via one or more base station antennas. Each of the base station 105 sites may provide communication coverage for a respective coverage area 110. In some embodiments, a base station 105 may be referred to as a base transceiver station, a radio base station, an access point, a radio transceiver, a basic service set (BSS), an extended service set (ESS), a NodeB, an eNodeB (eNB), a Home NodeB, a Home eNodeB, or some other suitable terminology. The coverage area 110 for a base station 105 may be divided into sectors making up only a portion of the coverage area. The system 100 may include base stations 105 of different types (e.g., macro, micro, or pico base stations). There may be overlapping coverage areas for different technologies.

In embodiments, the system 100 is an LTE/LTE-A network. In LTE/LTE-A networks, the terms evolved Node B (eNB) and user equipment (UE) may be generally used to describe the base stations 105 and user devices 115, respectively. The system 100 may be a Heterogeneous LTE/LTE-A network in which different types of base stations 105 provide coverage for various geographical regions. For example, each base station 105 may provide communication coverage for a macro cell, a pico cell, a femto cell, or other types of cell. A macro cell generally covers a relatively large geographic area (e.g., several kilometers in radius) and may allow unrestricted access by user devices 115 with service subscriptions with the network provider. A pico cell would generally cover a relatively smaller geographic area and may allow unrestricted access by user devices 115 with service subscriptions with the network provider. A femto cell would also generally cover a relatively small geographic area (e.g., a home) and, in addition to unrestricted access, may also provide restricted access by user devices 115 having an association with the femto cell (e.g., user devices in a closed subscriber group (CSG), user devices for users in the home, and the like). A base station 105 for a macro cell may be referred to as a macro eNB, for example. A base station 105 for a pico cell may be referred to as a pico eNB. And, a base station 105 for a femto cell may be referred to as a femto eNB or a home eNB. A base station 105 may support one or multiple (e.g., two, three, four, etc.) cells.

The core network 130 may communicate with the base stations 105 via backhaul links 132 (e.g., S1, etc.). The base stations 105 may also communicate with one another, e.g., directly or indirectly via backhaul links 134 (e.g., X2, etc.) or via backhaul links 132 (e.g., through core network 130). The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The base stations 105 may also communicate their frame timing and other parameters to the user devices 115. Thus, the wireless communications between the base stations 105 and user devices 115 may include transmission of various commands and parameters. Among the parameters that may be communicated from a base station 105 to a user device 115 are those that enable the user device 115 to participate in D2D discovery. These discovery parameters and their communication are further explained in the embodiments below.

The user devices 115 are dispersed throughout the wireless communications system 100, and each user device 115 may be stationary or mobile. A user device 115 may also be referred to by those skilled in the art as a UE, a mobile device, a mobile station, a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, a relay, or some other suitable terminology. A user device 115 may be a cellular phone, a personal digital assistant (PDA), a wireless modem, a wireless communications device, a handheld device, a tablet computer, a laptop computer, a cordless phone, a wireless local loop (WLL) station, or the like. A user device 115 may be able to communicate with macro eNBs, pico eNBs, femto eNBs, relays, and the like. A user device 115-a may also communicate directly with another user device 115 via D2D wireless communications. In one example, a user device 115 within a coverage area 110 of a base station 105 may serve as a relay for a user device 115-a that is outside the coverage area 110 of the base station 105. The in-coverage user device 115 may relay (or retransmit) communications from the base station 105 to the out-of-coverage user device 115-a. Similarly, the in-coverage user device 115 may relay communications from the out-of-coverage user device 115-*a* to the base station 105.

In order for a user device 115 to participate as a relay between base stations 105 and other user devices 115 (for example, out-of-coverage user device 115-*a*), the user devices 115 may participate in D2D discovery. The timing of the D2D discovery may be governed by parameters transmitted to the user devices 115 from a base station 105. These parameters and their use are explained in greater detail below.

The communication links 125 shown in wireless communications system 100 may include uplink (UL) transmissions from a user device 115 to a base station 105 or downlink (DL) transmissions, from a base station 105 to a user device 115. The downlink transmissions may also be called forward link transmissions while the uplink transmissions may also be called reverse link transmissions.

Figure 2:
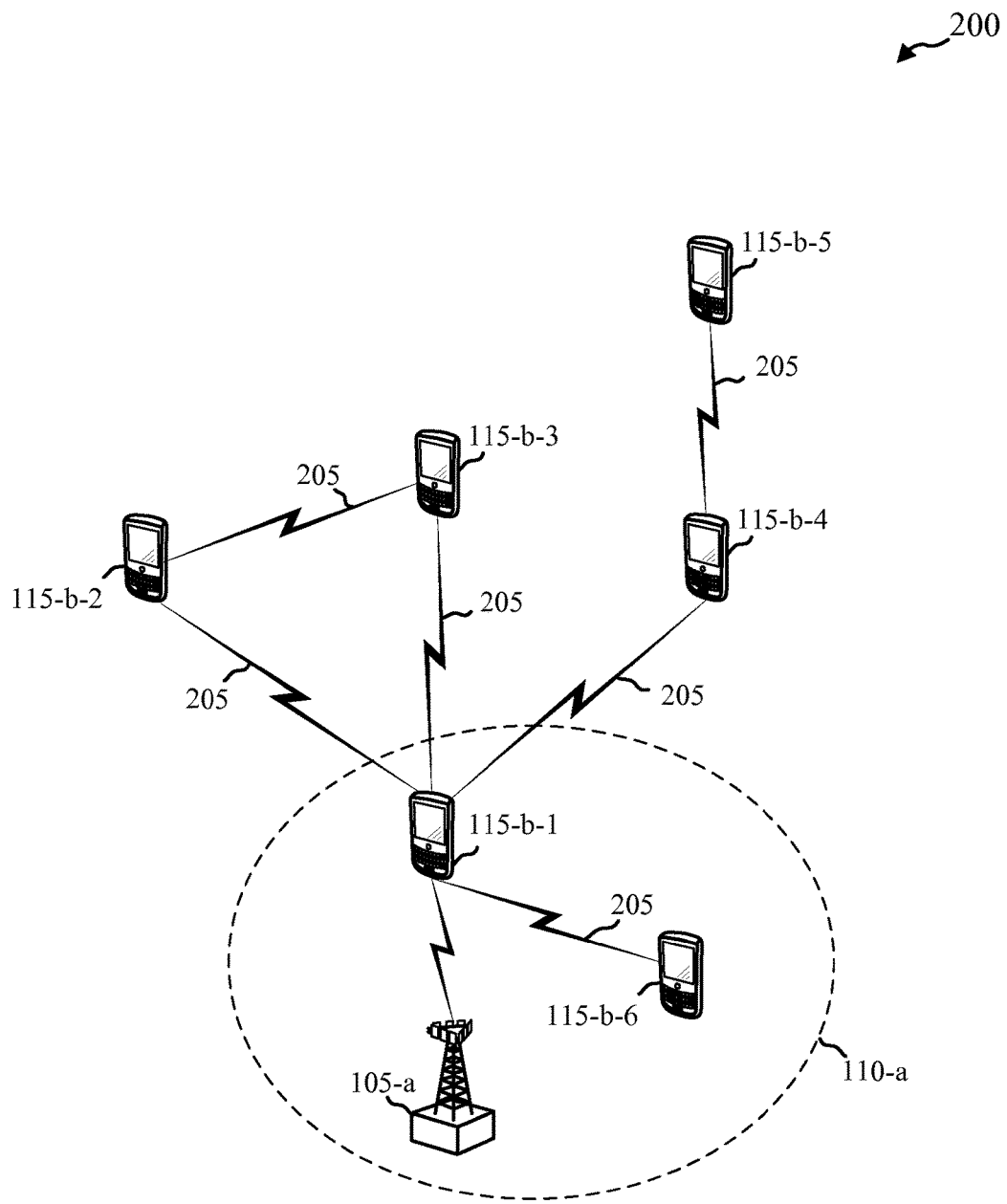
FIG. 2 is a block diagram of an example of a system for device-to-device discovery and wireless communication, in accordance with various embodiments.

FIG. 2 is a block diagram of an example of a system 200 in which various embodiments may be implemented. The system 200 of FIG. 2 may be an example of the wireless communication system 100 described with respect to FIG. 1. In one configuration, a base station 105-*a* may communicate with one or more devices that fall within a coverage area 110-*a* of the base station 105-*a*. An in-coverage user device 115-*b*-1 may receive/transmit communications from/to the base station 105-*a*. One or more user devices 115-*b*-2, 115-*b*-3, 115-*b*-4, 115-*b*-5 may be outside of the coverage area 110-*a* of the base station 105-*a* and may participate in D2D communications. Other user device 115-*b*-6 may be within the coverage area 110-*a* of the base station 105-*a*, but may also still participate in D2D communications. The base station 105-*a* and the user devices 115-*b* may be examples of the base stations 105 and user devices 115 described with reference to FIG. 1.

In one embodiment, the in-coverage user device 115-*b*-1 may broadcast, multi-cast, or unicast a peer discovery signal 205. The signal 205 may be sent to one or more user devices 115-*b* that are either in- or out-of-coverage. The peer discovery signal 205 may be a Long Term Evolution (LTE) Direct Peer-Discovery Signal. In one configuration, the signal 205 may include an identifier of the in-coverage user device 115-*b*-1. For example, the identifier may be a media access control (MAC) address of the in-coverage user device 115-*b*-1. In addition, the peer discovery signal 205 may include a relay status of the user device 115-*b*-1. The relay status may indicate whether the in-coverage user device 115-*b*-1 is capable of providing relay services for one or more out-of-coverage user devices 115-*b*.

In one example, an out-of-coverage user device 115-*b* may receive peer discovery signals indicating that each of one or more in-coverage user devices 115-*b* is capable of functioning as a relay device. The out-of-coverage user device 115-*b* may then select one of the in-coverage user devices 115-*b* to provide relay services. The determination as to which in-coverage user device 115-*b* to select may be based on a signal strength of the peer discovery signals received from each in-coverage user device 115-*b*, the identities of the in-coverage user devices 115-*b*, or various other factors (e.g., the remaining battery life of each in-coverage user device 115-*b* (if operating on batteries), the type(s) of service(s) supported by each in-coverage user device 115-*b* (if the relay devices are selective about which services or applications they can or are willing to provide relay service for), or the radio technology(ies) for which each in-coverage user device 115-*b* is willing to provide relay service. Some or all of these factors may be indicated or derived from peer discovery signals.

Some of the factors may also or alternately be obtained by querying the in-coverage user device(s) 115-*b* from which the out-of-coverage user device 115-*b* received relay status and identifier information.

In one configuration, an out-of-coverage user device 115-*b* may transmit a peer discovery signal 205 to one or more in-coverage user devices 115-*b*-1. The peer discovery signal may indicate that the out-of-coverage user device 115-*b* is out-of-coverage or requesting relay services. The signal may include an identifier of the out-of-coverage user device 115-*b*. In one configuration, a user device 115-*b* may broadcast a peer discovery signal 205 when it senses that it is about to be out of the coverage area 110-*a* of the base station 105-*a*. In another embodiment, a user device 115-*b* may broadcast the signal 205 after it is already out of the coverage area 110-*a*.

In one example, out-of-coverage user devices 115-*b*-2, 115-*b*-3 may communicate with each other. For example, the user devices 115-*b*-2, 115-*b*-3 may establish a direct D2D connection. The in-coverage user device 115-*b*-1 may also provide relay services to one or more out-of-coverage user devices 115-*b*. In one configuration, a first out-of-coverage user device 115-*b*-4 may serve as a relay device for a second out-of-coverage user device 115-*b*-5. The first out-of-coverage user device 115-*b*-4 may transmit a peer discovery signal 205 to inform the second out-of-coverage user device 115-*b*-5 that it (115-*b*-4) is capable of providing relay services. As another example, the second out-of-coverage user device 115-*b*-5 may transmit a signal 205 requesting relay services from the first out-of-coverage user device 115-*b*-4. As a result, the in-coverage user device 115-*b*-1 may relay communications to/from the base station 105-*a* from/to the first out-of-coverage user device 115-*b*-4. The first out-of-coverage user device 115-*b*-4 may relay at least a part of the communications from/to the second out-of-coverage user device 115-*b*-5.

As an additional example, two in-coverage user devices 115-*b*-1, 115-*b*-6 may also communicate with each other via a direct D2D connection. In this example, user device 115-*b*-6 may transmit a signal 205 requesting a direct D2D connection with other user devices 115-*b* proximate to user device 115-*b*-6. User device 115-*b*-1 may receive the request and then initiate direct D2D communications with user device 115-*b*-6.

Before any of the examples of D2D communication described above can occur, however, the user devices 115 receiving peer discovery signals 205 may be enabled to actually receive and decode the signals 205. Significantly, a receiving user device 115 may need to know when to listen for the peer discovery signals 205. In a synchronous deployment, the issue of timing can be simplified by using the common system timing broadcast by the base stations 105. However, in asynchronous deployments, the base stations 105 may not share a common system timing. Therefore, the user devices 115 may either learn or receive the timing of peer discovery signals sent from proximate user devices 115.

Additionally, a user device 115 seeking to receive a peer discovery signal 205 from another user device 115 may know which of the available time frequency resources are being used to transmit the peer discovery signal 205. Further, because the user devices 115 involved in D2D discovery at any given moment in time are likely to change, the discovery protocol used by the user devices 115 may be run periodically. The user devices 115 thus may have a need to know the periodicity of the available discovery resources.

In order to facilitate this communication, the base stations 105 can transmit necessary parameters that will allow D2D discovery. The necessary parameters may be transmitted via a system information block (SIB) or a dedicated radio resource control (RRC) message, for example.

FIG. 3 is an example of a part of a SIB message 300 carrying one or more parameters used by user devices 115 to participate in D2D discovery. The SIB message 300 is an example of parameters that are broadcast between a base station 105 and a user device 115, as described in FIG. 1 or 2. The SIB message 300 may be implemented in any one of existing SIB messages or may be an entirely new SIB message. The example illustrated in FIG. 3 shows that the SIB message 300 includes one or more discovery-related parameters. These include a discovery period parameter 305, an SFN extension parameter 310, a discovery offset parameter 315, a discovery subframes parameter 320, a discovery RB length parameter 325, discovery RB start and end point parameters 330, modulation and coding parameters 335, a position of synchronization signal parameter 340, a transmission power parameter 345, an allowed mode of operation parameter 350, a common or dedicated discovery resources parameter 355, a transmission resource selection method parameter 360, a DMRS usable cyclic shifts parameter 365, as well as other parameters 370. Each of these parameters is explained in detail below. The SIB message 300 is not limited to carrying the specific parameters illustrated in FIG. 3, nor need the SIB message 300 include each of the illustrated parameters.

The SIB message 300 may be used to transmit the discovery-related parameters from a base station 105 to one or more user devices 115. The parameters carried by SIB message 300 may alternatively be included in a dedicated RRC message that is transmitted from a base station 105 to one or more user devices 115.

Figure 4A:
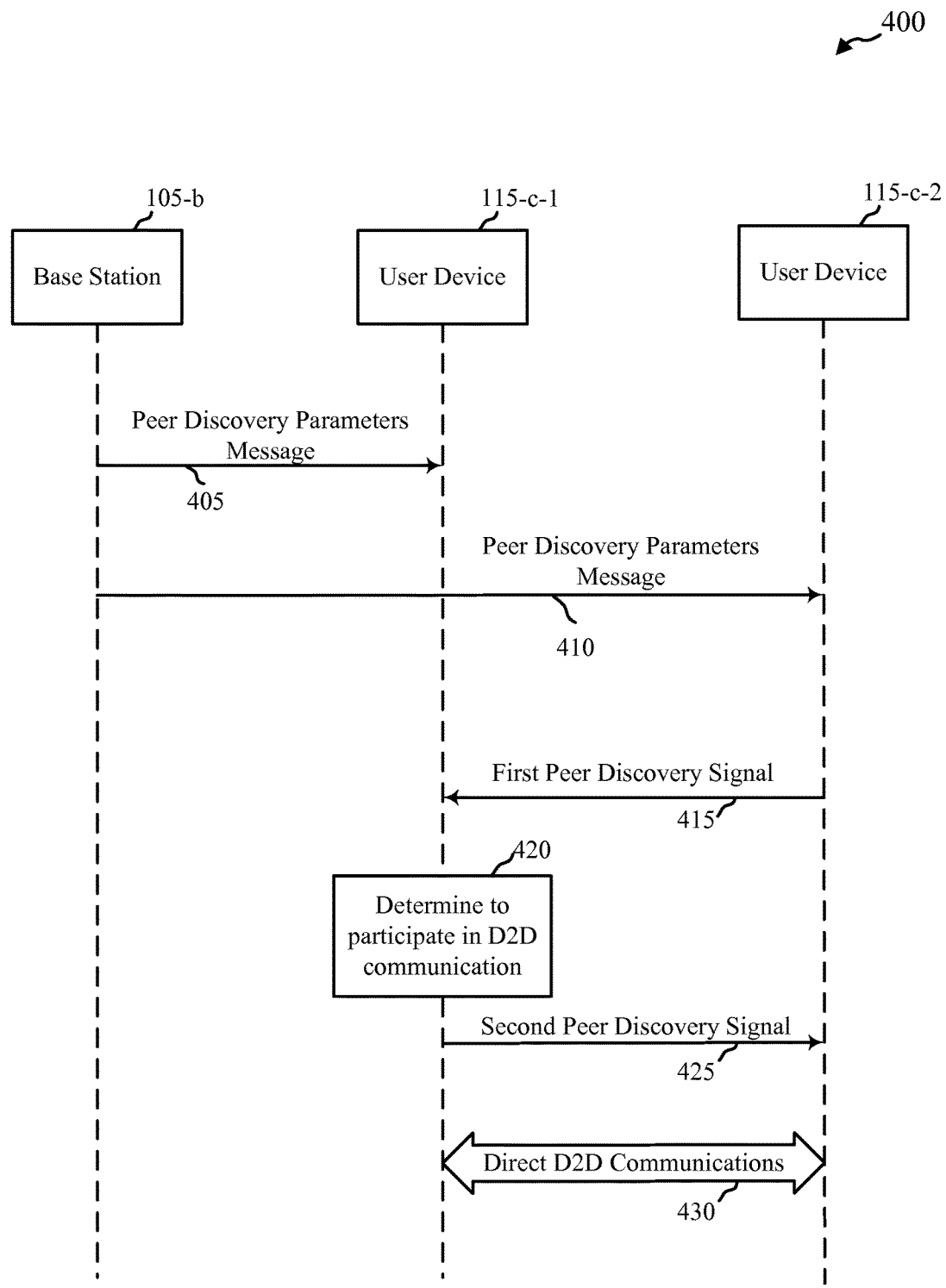
FIG. 4A is a message flow diagram illustrating example communications between user devices engaging in device-to-device discovery, in accordance with various embodiments.

FIG. 4A is a message flow diagram 400 illustrating an embodiment of communications between a base station 105-*b* and user devices 115-*c*-1 and 115-*c*-2 (referred to herein collectively as user devices 115-*c*). The base station 105-*b* and user devices 115-*c* may be examples of the base stations 105 and user devices 115 described in FIG. 1 or 2. Peer discovery parameters messages 405 and 410 may additionally be examples of the SIB message 300 described with respect to FIG. 3, as described above.

In one configuration, the base station 105-*b* may transmit the necessary peer discovery parameters to the user devices 115-*c*. The base station 105-*b* transmits a peer discovery parameters message 405 to the user device 115-*c*-1. The peer discovery parameters message 405 may be an example of the SIB message 300 (of FIG. 3). The base station 105-*b* also transmits a peer discovery parameters message 410 to the user device 115-*c*-2. The peer discovery parameters message 410 may also be an example of the SIB message 300 (of FIG. 3). Once the user devices 115-*c* have received the peer discovery parameters, the user devices 115-*c* are able to participate in D2D discovery.

As an example of D2D discovery, the user devices 115-*c*-1, 115-*c*-2 may use the received peer discovery parameters to each select a discovery resource among the resources reserved for discovery. Alternatively, specific discovery resources may be dedicated to or assigned by the base station 105-*b* to a particular user device 115. The user devices 115-*c*-1, 115-*c*-2 each transmit a discovery signal on the selected or assigned discovery resource during each discovery period. The user devices 115-*c*-1, 115-*c*-2 also listen for discovery signals from other user devices 115 on the remaining discovery resources. Once a user device 115 is discovered by another user device 115 (i.e., a discovery signal of the user device 115 is received by a different user device 115), the receiving user device 115 can respond directly to the transmitting user device 115 in order to establish a direct D2D communication.

Therefore, in the example of FIG. 4A, the user device 115-*c*-2 transmits a first peer discovery signal 415, which is received by the user device 115-*c*-1. Once the user device 115-*c*-1 elects to participate in D2D communication with the user device 115-*c*-2 (at block 420), the user device 115-*c*-1 transmits a response or second peer discovery signal 425 to the announcing user device 115-*c*-2. Through the exchange of the first and second peer discovery signals 415, 425, the user devices 115-*c*-1, 115-*c*-2 are enabled to engage in direct D2D communication 430 with each other.

Figure 4B:
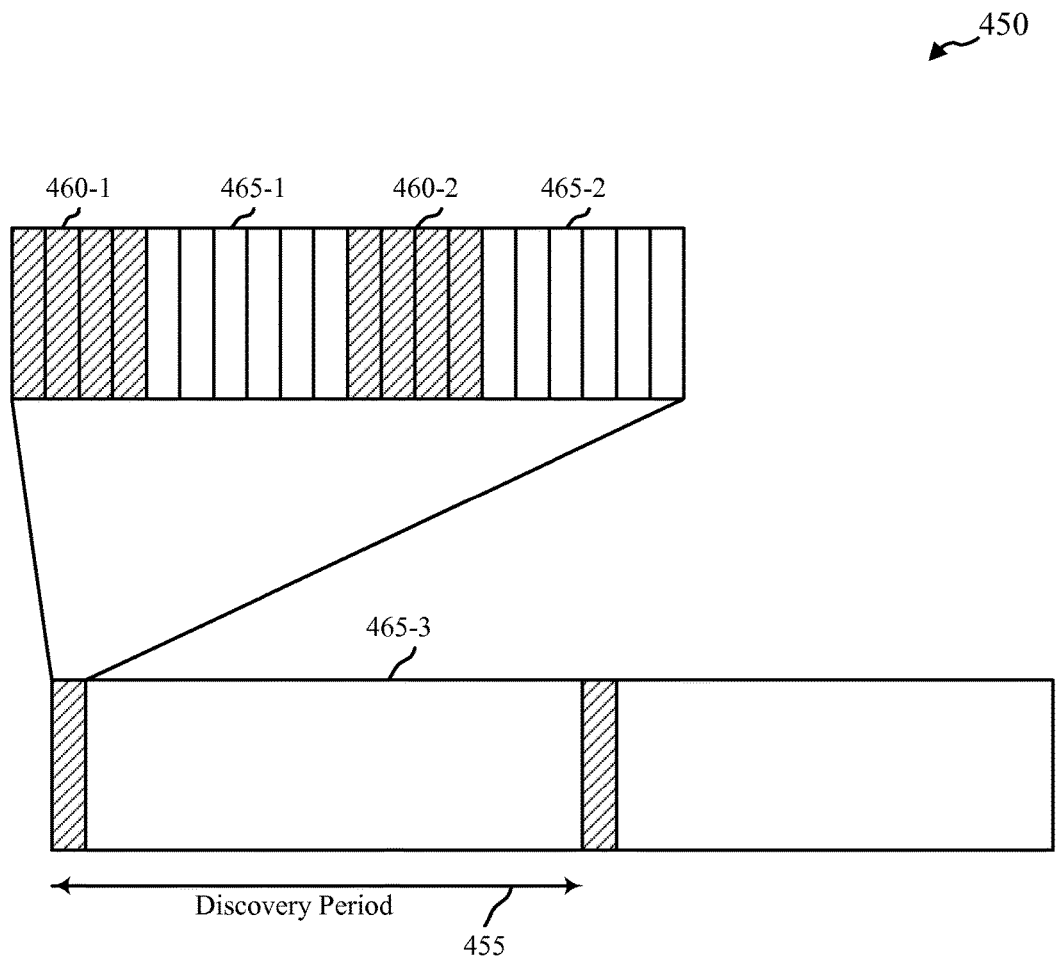
FIG. 4B is a block diagram illustrating example communications between user devices engaging in device-to-device discovery, in accordance with various embodiments.

An example of the communications between the user devices during D2D discovery is also illustrated in FIG. 4B. As illustrated in FIG. 4B, resources 450 may be allocated for D2D discovery as well as for network communications. Thus, the resources 450 illustrated in FIG. 4B may be examples of resources used during any of the communications between the user devices 115 and the base stations 105, as described with respect to FIG. 1, 2, or 4A. These resources may be organized into a periodically-available discovery period 455. During one portion of the discovery period 455, discovery subframes 460-1, 460-2 may be allocated for use in D2D discovery. Other subframes 465-1, 465-2, 465-3 are reserved for non-discovery-related communications such as wide area network (WAN) communications. The specific discovery subframes 460-1, 460-2 and their use may be specified by a peer discovery parameters message 405, 410 (as described with reference to FIG. 4A).

Figure 5:
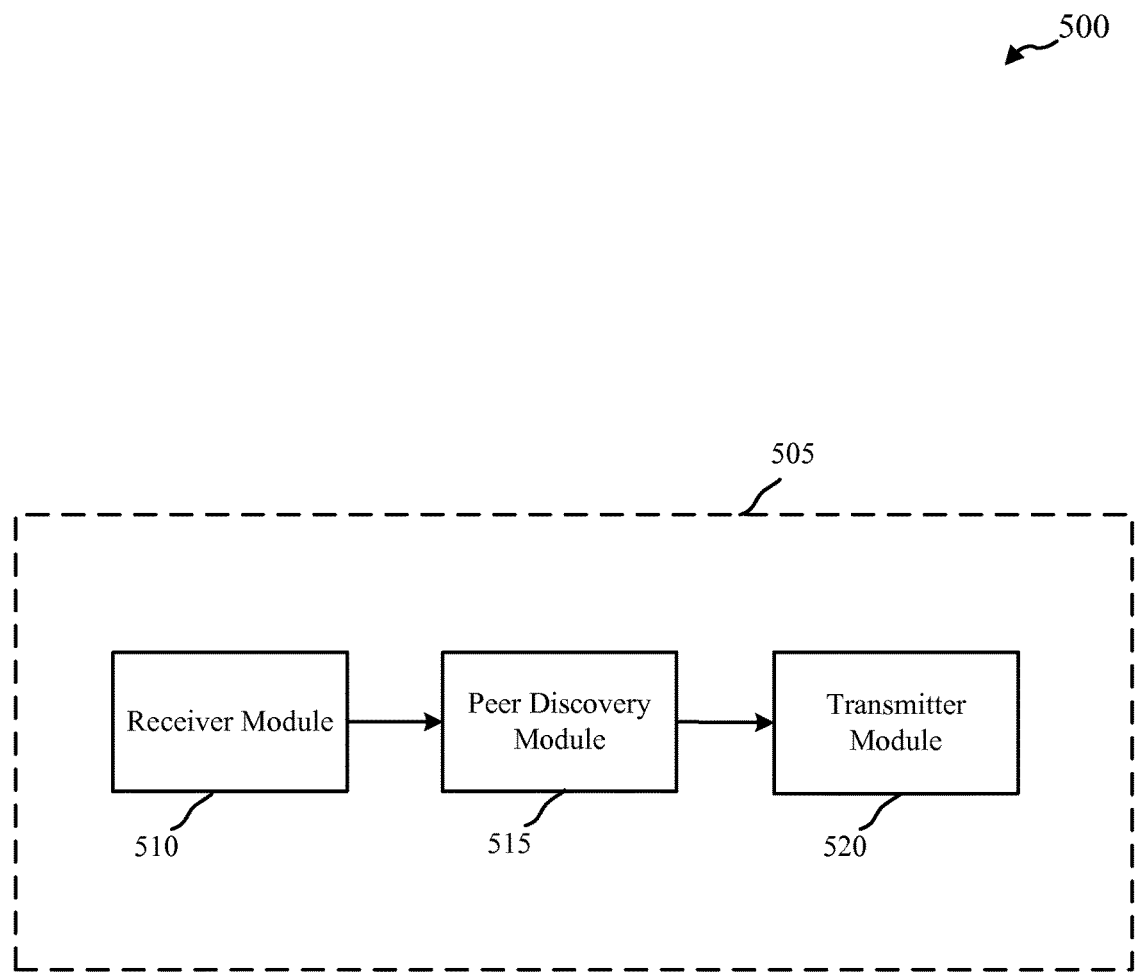
FIG. 5 is a block diagram of an example of a user device, in accordance with various embodiments.

FIG. 5 is an example of a block diagram 500 of an apparatus 505 for use in wireless communication, in accordance with various aspects of the present disclosure. In some examples, the apparatus 505 may be an example of aspects of one or more of the user devices 115 described with reference to FIG. 1, 2, or 4A, and may receive D2D parameters as illustrated in the SIB message 300 of FIG. 3. The apparatus 505 may also be a processor. The apparatus 505 may include a receiver module 510, a peer discovery module 515, or a transmitter module 520. Each of these components may be in communication with each other.

The components of the apparatus 505 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 510 may include at least one radio frequency (RF) receiver, such as at least one RF receiver operable to receive transmissions over a radio frequency spectrum. In some examples, the radio frequency spectrum may be used for LTE/LTE-A communications, as described, for example, with reference to FIG. 2. The receiver module 510 may be used to receive various types of data or control signals (i.e., transmissions) over one or more communication links of a wireless communications system, such as one or more communication links 125 of the wireless communications system 100 described with reference to FIG. 1. Examples of the types of data or control signals received by the receiver module 510 include the peer discovery signals 205, 415, 425, the SIB message 300 described with respect to FIG. 3, and the peer discovery parameters messages 405, 410 described with reference to FIG. 2 or 4A.

In some examples, the transmitter module 520 may include at least one RF transmitter, such as at least one RF transmitter operable to transmit discovery messages. The transmitter module 520 may be used to transmit various types of data or control signals (i.e., transmissions) over one or more communication links of a wireless communications system, such as one or more communication links 125 of the wireless communications system 100 described with reference to FIG. 1. Examples of the types of data or control signals transmitted by the transmitter module 520 include the peer discovery signals 205, 415, 425 described with reference to FIG. 2 or 4A.

In some examples, the peer discovery module 515 may be used to manage the receipt of peer discovery signals 205, 415, 425 (see FIGS. 2 and 4A) via the receiver module 510 or to manage the transmission of peer discovery signals 205, 415, 425 (see FIG. 2 or 4A) via the transmitter module 520. Managing the receipt and transmission of peer discovery signals may include receiving peer discovery parameters messages 405, 410 (of FIG. 4A) via the receiver module 510 and applying the received parameters to the process of receiving and transmitting peer discovery signals 205, 415, 425.

Figure 6:
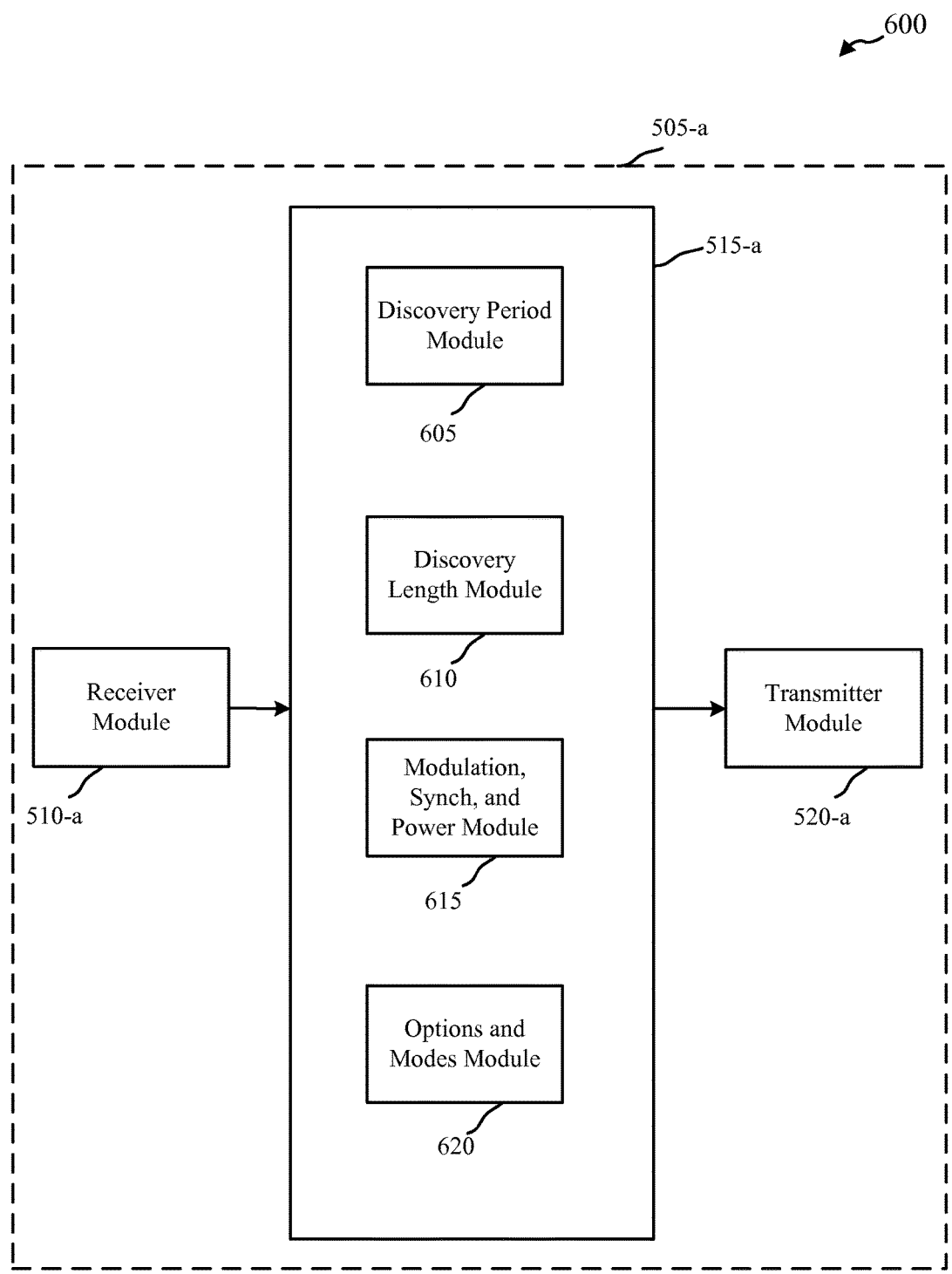
FIG. 6 is a block diagram of an example of a peer discovery module in a user device, in accordance with various embodiments.

FIG. 6 shows a block diagram 600 that includes apparatus 505-a, which may be an example of one or more aspects of the apparatus 505 (of FIG. 5) for use in wireless communication, in accordance with various aspects of the present disclosure. In some examples, the apparatus 505-a may include a receiver module 510-a and a transmitter module 520-a, which are examples of the receiver module 510 and transmitter module 520 of FIG. 5. In additional examples, the apparatus 505-a may include a peer discovery module 515-a, which may be an example of one or more aspects of the peer discovery module 515 of FIG. 5. In some examples, the peer discovery module 515-a may include a discovery period module 605, a discovery length module 610, a modulation, synchronization and power module 615 and an options and modes module 620. The modules 605, 610, 615, 620 are each for receiving and using various parameters in D2D discovery that may be received in one or more discovery parameters messages 405, 410 (of FIG. 4A) or in the SIB message 300 (of FIG. 3). Each of the modules 605, 610, 615, 620 may themselves include various submodules for receiving and using specific parameters, as described below.

Figure 7:
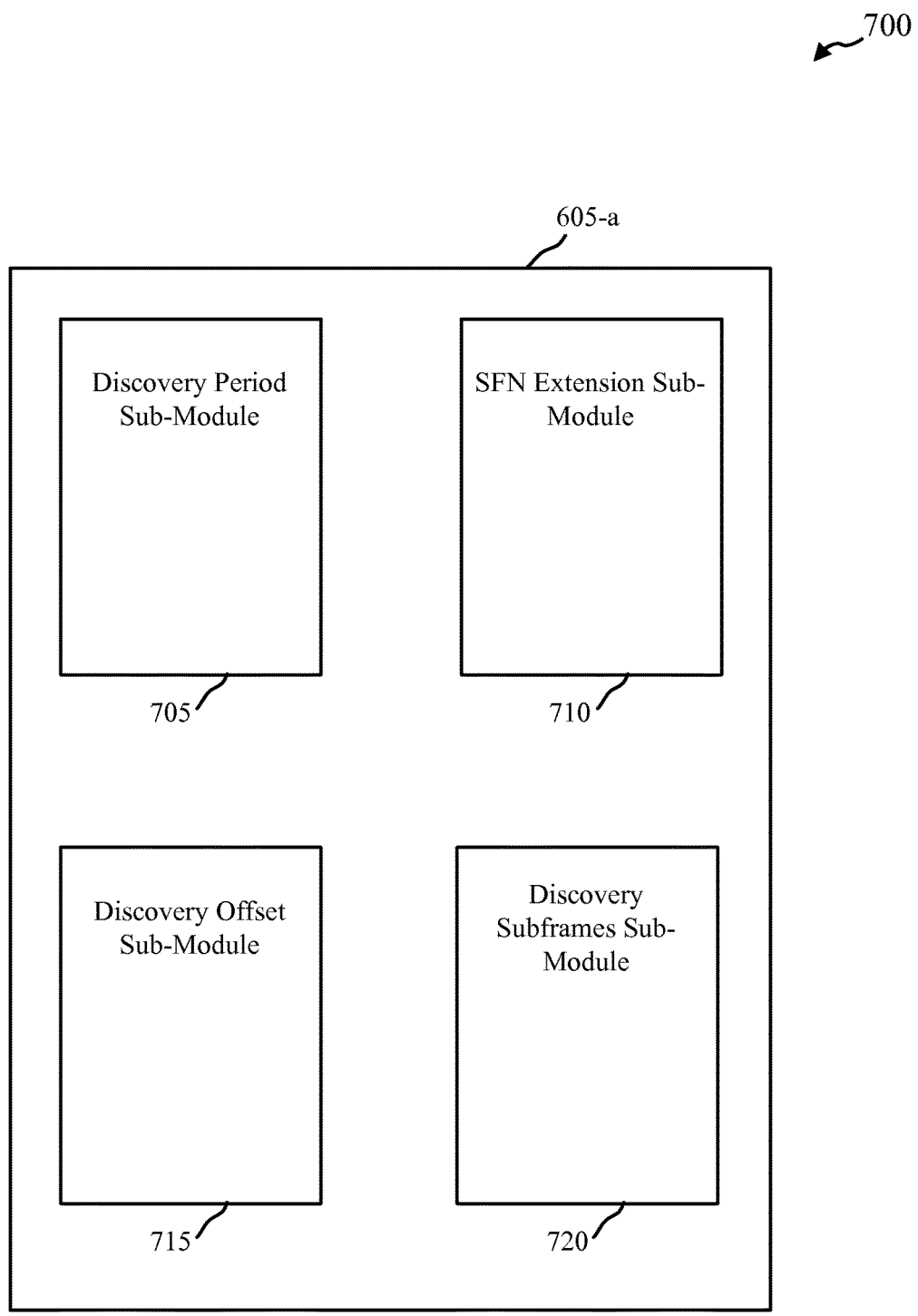
FIG. 7 is a block diagram of an example of a discovery period module, in accordance with various embodiments.

An example of the discovery period module 605 is illustrated in FIG. 7. FIG. 7 shows a block diagram 700 of one or more examples of aspects of the discovery period module 605 (of FIG. 6), in accordance with various aspects of the present disclosure. In the example of FIG. 7, the discovery period module 605 may include a discovery period submodule 705, a system frame number (SFN) extension submodule 710, a discovery offset submodule 715, and a discovery subframes submodule 720.

The discovery period submodule 705 enables the apparatus 505 (such as a user device 115) to receive and process a discovery period parameter 305 (see FIG. 3). The discovery period parameter 305 identifies a discovery period in which discovery resources are available for D2D discovery. The discovery period parameter 305 can be any value indicating a period of time. In an example, the discovery period parameter 305 is either a fraction (e.g., ¼, ½, etc.) or a multiple (e.g., 1, 2, 3, etc.) of the network's maximum SFN. In an LTE configuration, the maximum SFN is equal to 10.24 seconds. Therefore, the discovery period parameter 305 may be a fraction or a multiple of 10.24 seconds.

The discovery period includes a plurality of subframes. The subframes within the discovery period may all be reserved for D2D discovery. However, in order to reduce any interference with the user device's non-discovery-related communication, some of the subframes within the discovery period may be reserved for other network communications. Thus, not all of the subframes within the discovery period are reserved as discovery subframes. In fact, the discovery subframes within the discovery period may not even be contiguous with each other. Thus, the discovery period parameter 305 defines a period of time that is long enough to include all of the available discovery resources, even if the resources/subframes are not contiguous.

The discovery period parameter 305 is defined by a base station which then allocates a radio resource pool for discovery operations at the periodicity defined by the discovery period. The base station also ensures that the subframes in which the radio resources are allocated are not available for physical uplink shared channel (PUSCH) transmissions. For user devices that are connected via RRC, the base station ensures that any hybrid automatic repeat request (HARQ) operations which may fall on the allocated discovery resources are suspended.

During the assigned discovery period, user devices either transmit or receive discovery signals. For example, an announcer user device (a user device that is transmitting a discovery signal) may select one of the radio resources from the allocated radio resource pool and perform a discovery transmission. The user devices then use the rest of the discovery subframe in the discovery period to monitor discovery signals from other user devices. However, the user device can prioritize other events. For example, if an available discovery resource overlaps with, for example, paging, etc., the monitoring user device may suspend discovery in order to receive a paging message from a base station. In contrast, RRC_CONNECTED user devices can assume that any HARQ processes that overlap with allocate discovery subframes have been suspended.

In an embodiment, multiple discovery periods may be set using the discovery period parameter 305. Each discovery period can correspond to a class of user device. The discovery classes can be provided to a user device based on, for example, subscription rights. As an example, using multiple discovery periods allows a base station to assign a higher discovery period periodicity to a higher class user device so that the user device can be discovered in an accelerated manner. When there are multiple discovery periods, a monitoring user device may be configured to only be aware of certain discovery periods, based on, for example, a subscription of the user device. Alternatively, a monitoring user device may be configured to monitor all available discovery periods. In yet another embodiment, a monitoring user device may indicate to a user of the user device all available discovery periods, and thus allow the user to identify which of the available discovery periods should be monitored.

Multiple discovery periods may also be managed by configuring different user devices to be members of different numbered classes, where the class number represents a multiple of a base discovery period broadcast in, for example, an SIB message. In this manner, user devices can implement different discovery periods based on the user device class, even though a single common SIB message having a single discovery period parameter 305 is broadcast.

Some or all of the plurality of parameters may be different based on the class of the user device. For example, the parameters may have different forms, lengths, offsets, etc., based on the class of the user device.

Further, discovery resources can be allocated for specific purposes. For example, in an embodiment, some discovery resources may be allocated for commercial purposes while other discovery resources are allocated for public safety purposes. The differently-allocated resources may have different discovery periods. The discovery period parameter 305 carried in an SIB message 300, for example, can indicate that the discovery period is for a specific purpose.

The discovery period module 605 may also include an SFN extension submodule 710. The SFN extension submodule 710 may be used when the discovery period indicated by the discovery period parameter is longer than the maximum SFN. As an example, when the discovery period is a multiple of a maximum SFN, the SFN extension submodule 710 receives an SFN extension parameter 310 that indicates a number of times the maximum SFN is exceed during the discovery period. The SFN extension parameter 310 may be, for example, a counter that informs how many times SFN wrap-around has occurred during a single discovery period. Using the SFN extension parameter 310, the discovery resource pool may be located even for times within a discovery period that are in excess of the maximum SFN. The SFN extension parameter 310 is incremented by one each time the SFN wraps-around within the same discovery period. Once the discovery period is exceeded, meaning once a maximum extended SFN is reached, where the maximum extended SFN is equal to the discovery period as an integer multiple of 10.24 seconds, the SFN extension parameter 310 also wraps-around.

In the event that multiple discovery periods are identified within, for example, the SIB message, the maximum extended SFN can be set to be the maximum or longest discovery period. As the value of the SFN extension parameter 310 is regularly changing but does not necessarily represent a change in system information, the systemInfo-Modification RRC message or the systemInfoModification paging message (in an LTE system) may not be updated upon incrementation of the SFN extension parameter 310.

Both the announcer and the monitoring user devices keep track of the SFN extension parameter 310. The user devices can do this by checking the value each time that, for example, an SIB message is broadcast. Alternatively, the user devices can store the SFN extension parameter 310 as a local variable after the parameter is first acquired from an SIB message, for example. If stored as a local variable, the user devices handle the incrementation of the SFN extension parameter 310 each time that the maximum SFN is surpassed. Likewise, the user devices handle the wrap-around of the SFN extension parameter 310 each time that the discovery period or maximum extended SFN is passed.

The discovery period module 605-a may also include a discovery offset submodule 715. The discovery offset submodule 715 receives a discovery offset parameter 315 that indicates any offset between the start of the discovery period and a fixed time-based reference point. As an example, a fixed time-based reference point can be when SFN equals zero and any SFN extension also equals zero. Both monitoring and announcing user devices receive the discovery offset parameter 315 and add its value to the known reference point in order to calculate the discovery resource pool starting point.

In the event that multiple discovery periods are indicated by the discovery period parameter 305, the discovery offset parameter 315 will also indicate different corresponding offset values. For example, when the discovery period parameter 305 indicates different discovery periods based on class type (e.g., commercial class, public safety class, etc.) of the user devices, then the user devices will apply the offset that corresponds with their class type. The discovery offset parameter may also indicate an offset between a start of the discovery period and a fixed time-based reference point for both transmission and reception pools. In some examples, a neighbor reception pool offset may also be indicated with respect to the fixed reference point of a serving cell.

The discovery period module 605-a may also include a discovery subframes submodule 720. While allocated discovery subframes are available during every discovery period, the available discovery subframes may not be contiguous. Discovery subframes within a discovery period may be broken into groupings so that the user device does not neglect non-discovery activities for too long of a period. In other words, non-discovery subframes may be interspersed with discovery subframes. Therefore, the discovery subframes submodule 720 can receive a discovery subframes parameter 320 that indicates which subframes within the discovery period are available as discovery resources. The discovery subframes parameter 320 can be a bit map that indicates which subframes have been allocated for discovery purposes and which subframes have been allocated for non-discovery purposes (e.g., for wide area network (WAN) purposes).

The discovery subframes bit map can indicate the start point from where discovery resources start each discovery period. As an example, in the bit map, bits may be set to '1' if a corresponding subframe is allocated for discovery. Otherwise, bits are set to '0' if the corresponding subframe is allocated for, for example, WAN operation.

Monitoring and announcing user devices both use the discovery subframes parameter 320 bit map to identify available discovery subframes. In the event that multiple discovery periods are present for different class or type (e.g., commercial or public safety classes), the discovery subframes parameter 320 can include either a single bit map applicable for all discovery periods or the discovery subframes parameter 320 can include multiple different bit maps for the different discovery periods.

As an alternative, the discovery subframes parameter 320 need not be a bit map. Instead, the discovery subframes parameter 320 may be a string of values indicating successive lengths of contiguous discovery subframes and lengths of gaps between discovery subframes. In this way, the discovery subframes parameter 320 fully represents the available discovery subframes as well as the subframes available for WAN operations. Alternatively, the discovery subframes parameter 320 can represent subframes that correspond to certain HARQ processes reserved for discovery operation every discovery period.

In addition to the discovery period module 605, the peer discovery module 515 also includes a discovery length module 610, a modulation, synchronization and power module 615 and an options and modes module 620, as illustrated in FIG. 6. The discovery length 610 is able to receive and use various discovery parameters, either directly or through various sub-modules.

One parameter received through the discovery length module 610, for example, is the discovery RB length parameter 325. The discovery RB length parameter 325 indicates a number of RBs to be used for each discovery signal within a subframe available as a discovery resource. The discovery RB length parameter 325 can be a single value, in which case all available discovery subframes include that given number of discovery RBs. Alternatively, the discovery RB length parameter 325 may be multiple values, each value representing a length or number of RBs available within each partition of a subframe. Further, the discovery RB length parameter 325 may also indicate different RB lengths for different classes or types of user devices.

Announcer user devices use the discovery RB length parameter 325 in order to find appropriate discovery resources available for transmission of a discovery signal. In contrast, monitoring user devices use the discovery RB length parameter 325 to define the necessary size required at the physical layer in order to perform decoding operations.

Additional parameters received through the discovery length module 610 include the discovery RB start and end point parameters 330. These parameters are used with the discovery RB length parameter 325 to allow determination of where in each partition the allocated sets of RBs both start and stop. This is may be important when legacy WAN operations overlap a discovery resource such that PUCCH transmissions may still be in use.

In use, the announcer user devices use the received start point along with the discovery RB length parameter 325 to find an appropriate discovery resource for discovery signal transmission. This can be done, for example, by using a sliding window of length equal to the discovery RB length parameter 325 value and starting from the received start point and ending at the received end point. The resource framed by the sliding window can then be analyzed to determine if it is appropriate (e.g., the energy level of the resource can be measured and compared). This can be repeated until an appropriate discovery resource is found. Meanwhile, the monitoring user devices will use the discovery RB start and end point parameters 330 to determine when to begin decoding discovery signals. Decoding continues from the discovery start point, in steps of length equal to the value of the discovery RB length parameter 325, until the discovery end point is reached in each discovery subframe.

The modulation, synchronization and power module 615 may also receive various discovery parameters, either directly or through sub-modules. One set of parameters received at the modulation, synchronization and power module 615 are modulation and coding parameters 335. The modulation and coding parameters 335 indicate a modulation and coding scheme for discovery signal transmission. These parameters can be common for all types of user devices, or can alternatively be different for different types of classes of user devices. While the announcer user devices use this parameter to set the modulation and coding schemes, the monitoring user devices use this parameter to instruct respective physical layers to perform the appropriate decoding operations.

Another parameter received at the modulation, synchronization and power module 615 is the position of synchronization signal parameter 340. Base stations broadcast synchronization signals. When a user device shifts from a coverage area of a first base station and into the coverage area of a different base station, the user device will need to acquire the synchronization signal from the different base station. To facilitate this, user devices in the coverage of a first base station can forward that base station's synchronization signal to the user devices in the coverage of other base stations, thus allowing all of the user devices to more easily synchronize to the first base station. However, the radio resources used to transmit, from a user device, a base station's synchronization signal may vary, as set by the base stations. Therefore, the location of these synchronization signals, as forwarded by the user devices, can be indicated by the receipt of the position of synchronization signal parameter 340.

An example of when the synchronization signal parameter 340 is particularly useful is when a user device is very close to its base station. If, for example, a first user device is within the discovery range of another user device, but the first user device is too close to its own base station, the first user device may not be able to decode the synchronization signal transmitted by the base station of the second user device. To counter this issue, the other user device—the one participating in discovery with the first user device—may relay the synchronization signal of its associated base station. The synchronization signal can be relayed in, for example, the first subframe of the allocation for the other user device's respective macro. The relayed synchronization signal can be the same as a primary/secondary synchronization signal (PSS/SSS) transmitted by the other user device's macro. The relayed synchronization signal can also be a repeated PSS. In order to increase the power of the relayed synchronization signal, all user devices associated with the macro will transmit on the same time and frequency resource. Thus, the energy from many different user devices adds up at the receiving first user device. In order to reduce the possibility of overlap between the synchronization signal and the discovery signals of another non-neighboring macro of user devices that has a mostly overlapping allocation, the time and frequency resource can be located on the first few symbols of the first subframe. Additionally, the frequency on which the synchronization signal is transmitted may be different for non-neighboring macros that have mostly overlapping allocations. This allows a user device receiving the synchronization signal to distinguish between the synchronization signals of different macros. The relay of synchronization signals by user devices may be controlled by the respective base stations. For example, different base stations may instruct user devices to broadcast synchronization signals with different periodicity. Additionally, broadcast of synchronization signals may be limited to only certain classes of user devices. Alternatively, user devices may be selected randomly for synchronization signal broadcast.

As mentioned above, however, the positions of these synchronization signals may be different for different base stations. Thus, the position of synchronization signal parameter 340 can indicate a position of the signal for a neighboring base station. This allows a monitoring user device, for example, to know how to receive a particular synchronization signal of the neighboring base station as it is relayed by the other user devices.

Another parameter received at the modulation, synchronization and power module 615 is the transmission power parameter 345. As needed, discovery operations may need to be limited in the power used. Accordingly, the transmission power parameter 345 may be received and indicates a power level for discovery signal transmission. If the transmission power parameter 345 is absent, a user device is able to use its maximum power for discovery operations. Otherwise, the user device will be power-limited based on the value of the parameter.

In an embodiment, all of the allocated discovery resources can be partitioned into different transmission power zones. In this case of multiple power zones, the transmission power parameter 345 will indicate, in addition to a transmission power value for each zone, a start and end point defining each zone. Thus, the transmission power parameter 345 is used by announcer user devices to transmit discovery signals at designated power levels in the selected or assigned discovery resources.

As an example, discovery resources can be partitioned into either low or high power zones. Low power and high power resources can each be either frequency-domain multiplexed (FDM) or time-domain multiplexed (TDM). When the power zones are FDM, the transmission power parameter 345 may be a bit map commonly representing subframes allocated for discovery, with the start and end points of both low and high power resources being indicated. Alternatively, start and end points for power zones may be indicated in the form of a starting RB position and an RB length for either a low power or high power resource. The remainder of the resources in that subframe are reserved for the other remaining power level. The announcer user devices can thus use the power transmission parameter to perform a calculation to find the low power and high power resources in a discovery subframe. Monitoring user devices can, if desired, monitor both low and high power resources. However, in another embodiment, monitoring user devices may also perform calculations to locate a particular low power or high power resource pool in a discovery subframe if the user device is of a member of a class that is only allowed to monitor one of either low or high power resources.

When low power and high power resources are TDM, then the power transmission parameter can be two separate bit maps: one indicating discovery subframes for low power and one for discovery subframes for high power. In an embodiment, one common offset from a reference point can indicate the start position of the discovery subframe bit map. Therefore, in this situation, one resource pool starts at the indicated offset while the other resource pool starts at the offset plus the bit map length of the initial resource. In contrast, and in a different embodiment, the power transmission parameter may include separate offsets from a reference point for low power and high power. In yet another embodiment, low power and high power resources can be interleaved by subframe and can have a same offset from a common reference point. Nevertheless, each of the interleaved bit maps need not be the same length, but could also be different lengths. In this embodiment, user devices combine both bit maps to identify all discovery subframes as well as all WAN operation subframes. In yet another embodiment, the length of the bit maps can also be indicated.

When low power and high power resources are TDM, the announcer user device uses either the low power or high power zones as required by the base station that serves the user device. In contrast, the monitoring user devices can monitor both low power and high power resources. However, in some embodiments, the monitoring user devices are restricted by class to only monitoring one type of power resource. In yet another embodiment, different power zones can have different periodicity. For example, the combination of a low maximum power zone, using only a small number of subframes and with a fast duty cycle could be beneficial for short range discovery.

The options and modes module 620 (of FIG. 6) can receive still more discovery parameters. One parameter received either by the options and modes module 620 or by sub-modules within the options and modes module 620 is the mode of operation parameter 350. The mode of operation parameter 350 indicates whether discovery can occur when the user device is in a connected mode or in an idle mode, or both. These modes are commonly indicated as either an RRC_CONNECTED mode or an RRC_IDLE mode. Additionally, it is possible that transmission of discovery signals and reception of discovery signals may have different allowed mode settings. Thus, the allowed mode of operation parameter 350 would indicate any settings that are contingent on the desired discovery activity. Therefore, the mode of operation parameter can be the same, but could also be different for both announcing user devices and monitoring user devices. Of course, user devices would be allowed to transition into an allowed state before participating in discovery. Further, the mode of operation parameter can vary based on the class of the user device.

Another parameter received either by the options and modes module 620 or by sub-modules within the options and modes module 620 is the common or dedicated discovery resource pool parameter. This parameter indicates whether discovery resources are common to user devices or whether specific discovery resources are dedicated to specific user devices. Depending on the network configuration, certain user devices perform discovery transmission in a common discovery pool by autonomously selecting a discovery radio resource from the available discovery resources. In contrast, other user devices can be assigned dedicated resources for discovery signal transmission.

Common and dedicated resources can be FDM or TDM. In the case that the resources are FDM, the common or dedicated discovery resource pool parameter can be a commonly accessed bit map representing subframes allocated for discovery, and start and end points of both the common and dedicated discovery resources will be indicated. Start and end points can be indicated in the form of a starting position of an RB and an RB length of either common or dedicated resources. The remainder of the resources in that subframe are reserved for the other remaining type (either common or dedicated). The announcer user devices can thus use the common or dedicated discovery resource pool parameter to perform a calculation to find the common and dedicated resources in a discovery subframe. Monitoring user devices can, if desired, monitor both common and dedicated resources. However, in another embodiment, monitoring user devices may also perform calculations to locate a particular common or dedicated resource pool in a discovery subframe if the user device is of a member of a class that is only allowed to monitor one of either common or dedicated resources.

When common and dedicated resources are TDM, separate bit maps for common discovery subframes and dedicated discovery subframes may be used for the common or dedicated discovery resource pool parameter. In an embodiment, one common offset from a reference point can indicate the start position of the discovery subframe bit map. Therefore, in this situation, one resource pool starts at the indicated offset while the other resource pool starts at the offset plus the bit map length of the initial resource. In contrast, and in a different embodiment, the common or dedicated discovery resource pool parameter may include separate offsets from a reference point for common and dedicated resources. In yet another embodiment, common and dedicated resource bit maps can be interleaved by subframe and can have a same offset from a common reference point. Nevertheless, each of the interleaved bit maps need not be the same length, but could also be different lengths. In this embodiment, user devices combine both bit maps to identify all discovery subframes as well as all WAN operation subframes. In yet another embodiment, the length of the bit maps can also be indicated.

When common and dedicated resources are TDM, the announcer user device uses either the common or dedicated resources as required by the user device's base station. In contrast, the monitoring user devices can monitor both common and dedicated resources. However, in some embodiments, the monitoring user devices are restricted by class to only monitoring one type of resource. In yet another embodiment, different resource types can have different periodicity.

Another parameter received either by the options and modes module 620 or by sub-modules within the options and modes module 620 is the transmission resource selection method parameter 360. This parameter 360 indicates a method to be used by a user device for selecting which of the available discovery resources is to be used for discovery signal transmission. For example, the resource selection method parameter 360 could indicate that a user device is to randomly select from the discovery resources available to the user device (in accordance with all other parameters received by the user device). Alternatively, this parameter 360 could instruct a user device to select discovery resources based on energy levels of the available resources. For example, if the user device detects that energy levels for a given resource exceed a threshold, then the user device may elect not to use that resource, but to instead use resources that have lower energy levels. As a third alternative, the transmission resource selection method parameter 360 may indicate that a user device should select resources so as to group resources together.

Yet another parameter received either by the options and modes module 620 or by sub-modules within the options and modes module 620 is the demodulation reference signal (DMRS) usable cyclic shifts parameter. This parameter indicates which DMRS cyclic shifts are available and the time-varying pattern of the DMRS shifting.

Additional parameters that may be received by the user device via, for example, the options and modes module 620, include a system time parameter and parameters related to the duration that dedicated resources may be assigned. These parameters may be received under the category of other parameters 370 (with reference to the SIB message 300 of FIG. 3). A system time parameter indicates a system, or wall clock time, which is the same for all user devices. The system time parameter provides a system time which may then be used in conjunction with a security key to perform hashing operations on the discovery messages to be transmitted. The system time parameter can be used as transmitted from SIB 16 or could alternatively be used as a parameter in a new discovery SIB message. As an alternative to using a system time for hashing, SFN or extended SFN may be used if the network is synchronous. As a further alternative, a shared counter value, shared between neighboring base stations, could be used in place of the system time (for hashing operations). As the value of the system time parameter regularly changes but doesn't necessarily represent a change in system information, the systemInfoValueTag message or the systemInfoModification paging message (in an LTE system) may not be updated upon incrementation of the system time parameter.

Because dedicated discovery resources may only be dedicated for a period of time (e.g., a number of discovery periods, or a number of discovery transmissions), this number or limitation on the period of an assigned dedicated discovery resource can also be included as a discovery parameter received by the user devices. Similarly, user devices may also receive as a discovery parameter a limitation on the number of empty discovery transmissions that can occur before a user device may assume that the dedicated resources used for the transmissions have been reassigned.

All or some of the above-described parameters may be broadcast to user devices from their respective base stations, where the received parameters relate specifically to the base stations corresponding to the receiving user device. However, a base station may also broadcast all or some of the above-described parameters as they pertain to neighboring base stations. The broadcast parameters pertaining to neighboring base stations may also be broadcast in, for example, a discovery SIB message 300 (see FIG. 3). While each of the parameters pertaining to a neighboring base station may be broadcast, some of the more relevant parameters in some examples may include the discovery period and SFN extension parameters 305, 310, the discovery subframes parameter 320, the discovery offset parameter 315, the discovery RB length parameter 325, the discovery RB start and end point parameters 330, and the position of synchronization signal parameter 340. In most cases, if any of the parameters are missing for a neighboring base station, a user device can attempt to use the parameters for the base station currently serving the user device. In particular, while the position of synchronization signal parameter 340 for a neighbor base station should be provided, the absence of any of the other parameters for a neighboring base station can simply mean that the values for the neighboring base station and for the current base station are the same.

All or some of the above-described parameters may also be provided for each frequency and/or for each network (such as a public land mobile network (PLMN)) in the neighborhood. It is possible that multiple carrier networks may share one carrier frequency for discovery, or there may be carrier aggregation in which a primary base station broadcasts the discovery information relating to a secondary base station. In this case, the discovery SIB message will also carry the information related to the frequency where discovery is performed.

When the format of the discovery SIB message is updated, all user devices may need to be informed that an update is required. Accordingly, base stations can broadcast (as part of, for example, an SIB message or a paging message) an instruction that the user devices may reset and update.

For example, updates may need to occur when an announcer user device desires to obtain a D2D expression code from a base station, and a monitoring user device desires to obtain a D2D filter in order to monitor one or more user devices. There may even be times when a base station desires all user devices to receive updated expression codes or filter codes. As an example, a base station may receive an instruction for all connected user devices to update from a mobility management entity (MME) (which may have received the instruction via a ProSe instruction). Once a base station receives the instruction, the base station may broadcast (as part of, for example, an SIB message or a paging message) the instruction that the user devices may reset and update.

As another example, when an SIB message (for example, SIB message 300) is changed and this change is to be indicated to the user devices participating in D2D discovery, a base station may send a page message indicating that there is a change in the SIB message. The page message may contain an indication that there is a change in the SIB message used for D2D discovery. In this way, only those user devices that are participating in D2D discovery will need to update the SIB message. Other user devices not participating in D2D discovery may ignore the request to update.

Figure 8:
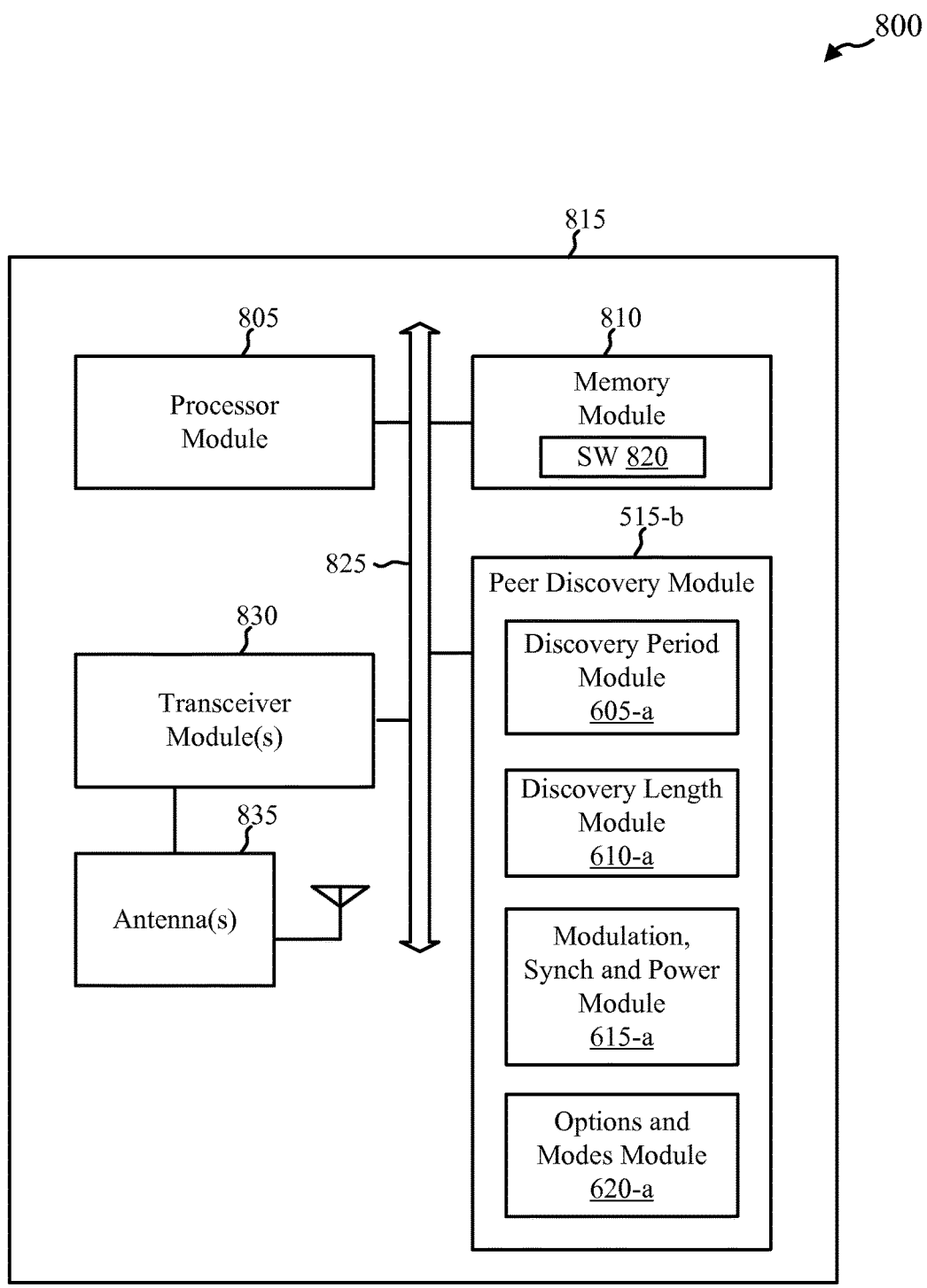
FIG. 8 is a block diagram of an example of a user device, in accordance with various embodiments.

FIG. 8 shows a block diagram 800 of a user device 815 for use in wireless communication, in accordance with various aspects of the present disclosure. The user device 815 may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The user device 815 may, in some examples, have an internal power supply, such as a small battery, to facilitate mobile operation. In some examples, the user device 815 may be an example of one or more aspects of one of the user devices 115 or apparatus 505 described with reference to FIGS. 1, 2, 4A, 5, or 6. The user device 815 may be configured to implement at least some of the features and functions described with reference to FIGS. 1, 2, 3, 4A, 5, 6, or 7.

The user device 815 may include a processor module 805, a memory module 810, at least one transceiver module (represented by transceiver module(s) 830), at least one antenna (represented by antenna(s) 835), or a peer discovery module 515-b. Each of these components may be in communication with each other, directly or indirectly, over one or more buses 825.

The memory module 810 may include random access memory (RAM) or read-only memory (ROM). The memory module 810 may store computer-readable, computer-executable software (SW) code 820 containing instructions that are configured to, when executed, cause the processor module 805 to perform various functions described herein for communicating, for example, discovery-related messages. Alternatively, the software code 820 may not be directly executable by the processor module 805 but be configured to cause the user device 815 (e.g., when compiled and executed) to perform various of the functions described herein.

The processor module 805 may include an intelligent hardware device, e.g., a CPU, a microcontroller, an ASIC, and the like. The processor module 805 may process information received through the transceiver module(s) 830 or information to be sent to the transceiver module(s) 830 for transmission through the antenna(s) 835. The processor module 805 may handle, alone or in connection with the peer discovery module 515-b, various aspects of receiving and managing discovery parameters.

The transceiver module(s) 830 may include a modem configured to modulate packets and provide the modulated packets to the antenna(s) 835 for transmission, and to demodulate packets received from the antenna(s) 835. The transceiver module(s) 830 may, in some examples, be implemented as one or more transmitter modules and one or more separate receiver modules. The transceiver module(s) 830 may support discovery-related communications. The transceiver module(s) 830 may be configured to communicate bi-directionally, via the antenna(s) 835, with one or more of the base stations 105 described with reference to FIG. 1 or 2. While the user device 815 may include a single antenna 835, there may be examples in which the user device 815 may include multiple antennas 835.

The peer discovery module 515-b may be configured to perform or control some or all of the features or functions described with reference to FIGS. 1, 2, 3, 4A, 5, 6, or 7 related to D2D discovery. For example, the peer discovery module 515-b may be configured to support receipt and management of some or all of the discovery parameters described above and identified in, for example, a discovery SIB message 300 (as illustrated in FIG. 3). In some examples, and by way of example, the peer discovery module 515-b may be an example of one or more aspects of the peer discovery module 515 described with reference to FIG. 5, 6 or 7. The peer discovery module 515-b may include a discovery period module 605-a (which may be an example of a discovery period module 605 of FIG. 6 or 7), a discovery length module 610-a (which may be an example of a discovery length module 610 of FIG. 6), a modulation, synchronization and power module 615-a (which may be an example of a modulation, synchronization and power module 615 of FIG. 6), and an options and modes module 620-a (which may be an example of the options and modes module 620 of FIG. 6). The peer discovery module 515-b, or portions of it, may include a processor, or some or all of the functions of the peer discovery module 515-b may be performed by the processor module 805 or in connection with the processor module 805.

Figure 9:
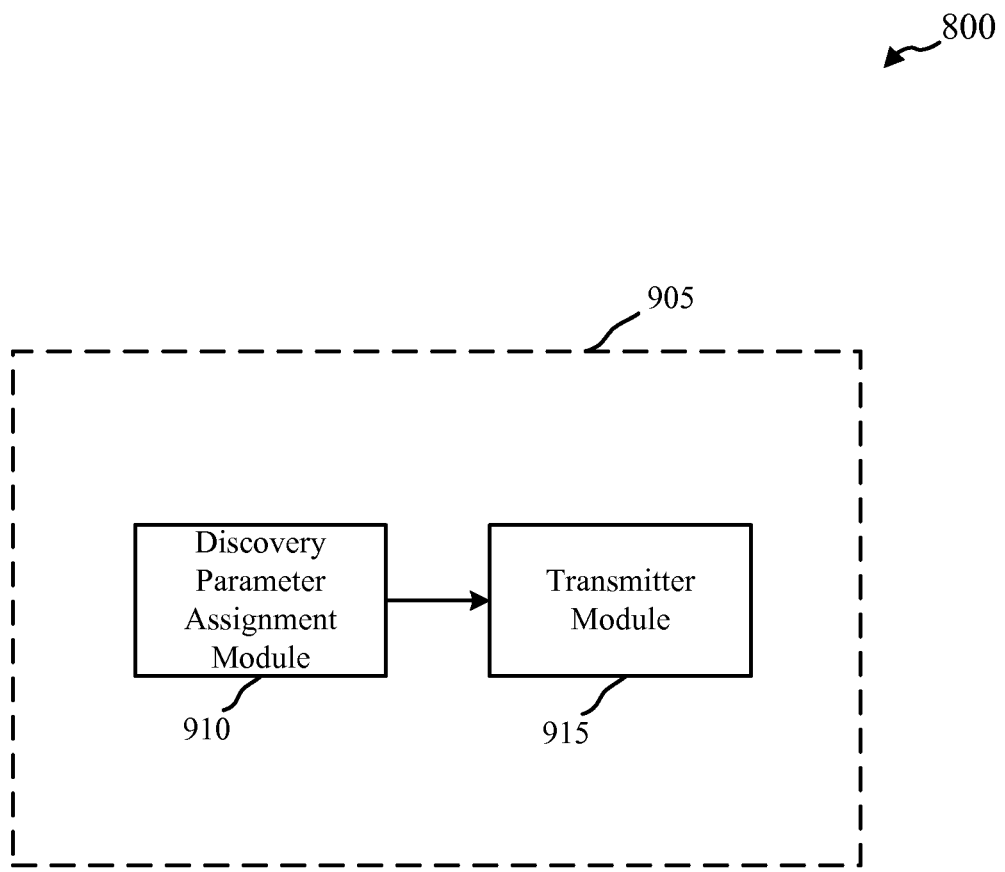
FIG. 9 is a block diagram of an example of a base station, in accordance with various embodiments.

FIG. 9 is an example of a block diagram 900 of an apparatus 905 for use in wireless communication, in accordance with various aspects of the present disclosure. In some examples, the apparatus 905 may be an example of aspects of one or more of the base stations 105 described with reference to FIG. 1, 2, or 4A. The apparatus 905 may also be a processor. The apparatus 905 may include a discovery parameter assignment module 910 and/or a transmitter module 915. Each of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the transmitter module 915 may include at least one RF transmitter, such as at least one RF transmitter operable to transmit at least the discovery parameters identified above. The transmitter module 915 may be used to transmit various types of data or control signals (i.e., transmissions) over one or more communication links of a wireless communications system, such as one or more communication links 125 of the wireless communications system 100 described with reference to FIG. 1. Examples of the types of data or control signals transmitted by the transmitter module 915 include the peer discovery parameters messages 405, 410 described with reference to FIGS. 2 and 4A.

In some examples, the discovery parameter assignment module 910 may be used to manage the transmission of peer discovery parameters messages 405, 410 (see FIG. 4A) via the transmitter module 915. The managing peer discovery parameters messages 405, 410 may include populating discovery SIB messages, for example, or dedicated RRC messages.

Figure 10:
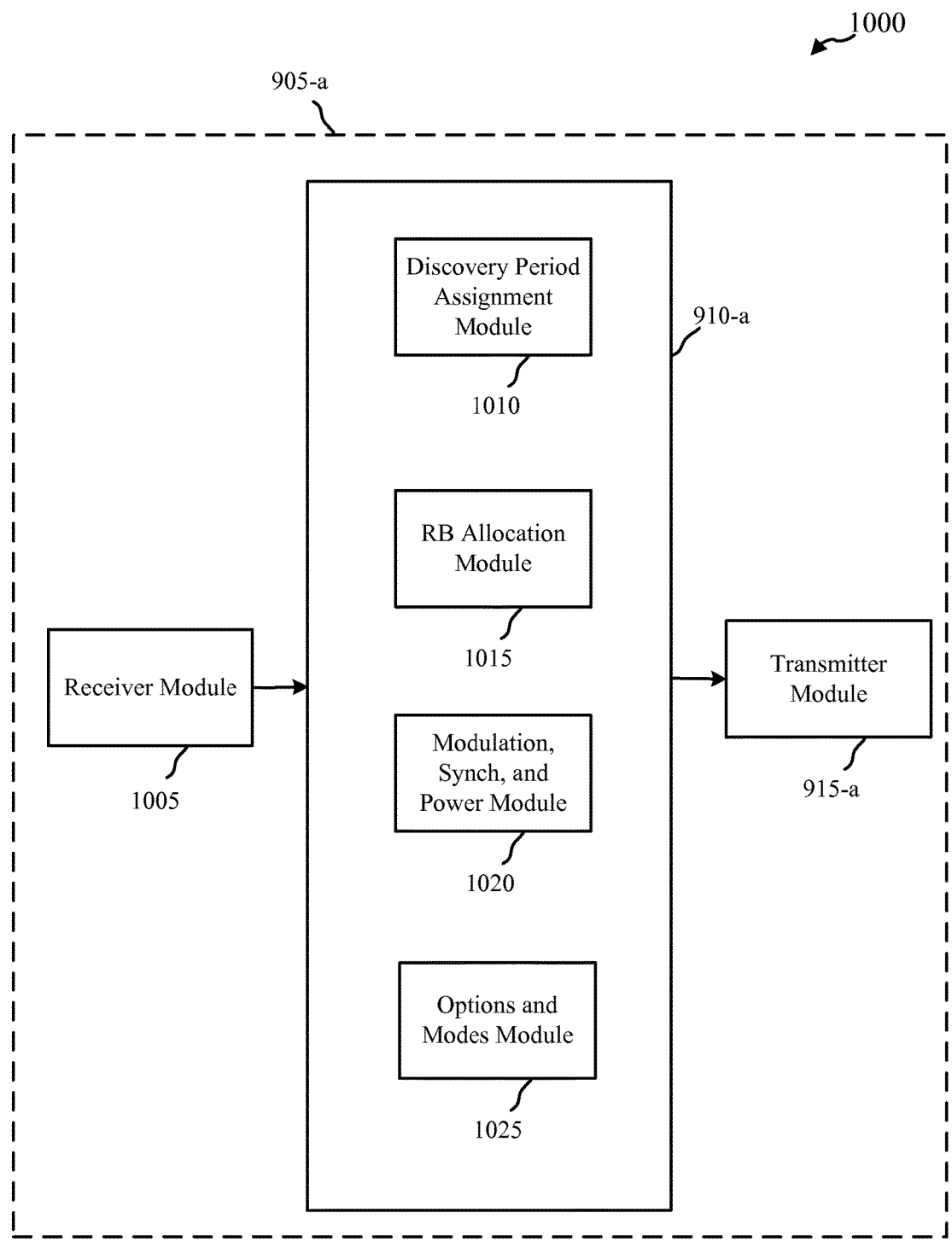
FIG. 10 is a block diagram of an example of a discovery parameters module in a base station, in accordance with various embodiments.

FIG. 10 shows a block diagram 1000 of one or more examples of aspects of an apparatus 905-a for use in wireless communication, in accordance with various aspects of the present disclosure. The apparatus 905-a may be an example of apparatus 905 as described in FIG. 9. The apparatus 905-a may include both a discovery parameters assignment module 910-*a* and a transmitter module 915-*a*. The apparatus 905-*a* may also include a receiver module 1005.

The components of the apparatus 905-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the transmitter module 915-*a* may include at least one RF transmitter, such as at least one RF transmitter operable to transmit at least the discovery parameters identified above. The transmitter module 915-*a* may be an example of the transmitter module 915 described with reference to FIG. 9. The transmitter module 915-*a* may be used to transmit various types of data or control signals (i.e., transmissions) over one or more communication links of a wireless communications system, such as one or more communication links 125 of the wireless communications system 100 described with reference to FIG. 1. Examples of the types of data or control signals transmitted by the transmitter module 915 include the peer discovery parameters messages 405, 410 described with reference to FIG. 2 or 4A.

In some examples, the receiver module 1005 may include at least one RF receiver, such as at least one RF receiver operable to receive wireless communications from the user devices 115 and the apparatuses 505 described with reference to FIGS. 1, 2, 4A, 5, 6, 7, 8, or 9.

In some examples, the discovery parameter assignment module 910-*a* may be used to manage the transmission of peer discovery parameters messages 405, 410 (see FIG. 4A) via the transmitter module 915. The discovery parameter assignment module 910-*a* may be an example of the discovery parameter assignment module 910 described with respect to FIG. 9. The discovery parameter assignment module 910-*a* may, for example, populate SIB messages or dedicated RRC discovery messages. In some examples, the discovery parameter assignment module 910-*a* populates the SIB or dedicated RRC discovery messages by determining or inserting one or more of the above-described discovery parameters into the SIB discovery message or the dedicated RRC discovery message. For example, the discovery parameter assignment module 910-*a* may include various modules that determine or populate the discovery parameters. A discovery period assignment module 1010 may be used to determine or populate the discovery period parameter 305, the SFN extension parameter 310, the discovery offset parameter 315, and the discovery subframes parameter 320, as these parameters are described above. An RB allocation module 1015 may be used to determine or populate the discovery RB length parameter 325 and the discovery RB start and end point parameters 330. A modulation, synchronization and power module 1020 may be used to determine or populate the modulation and coding parameter, the position of synchronization signal parameter 340 and the transmission power parameter 345. An options and modes module 1025 may be used to determine or populate the allowed mode of operation parameter 350, the common or dedicated discovery resources parameter 355, the transmission resource selection method parameter 360 and the DMRS usable cyclic shifts parameter 365. Operations on any of the parameters by the discovery parameter assignment module 910-*a* may occur within various modules and sub-modules and are not limited by the example illustrated in FIG. 10. Further, additional parameters may be generated or populated by the discovery parameter assignment module 910-*a*, such as the system time parameter and the parameters related to the duration that dedicated resources may be assigned.

Figure 11:
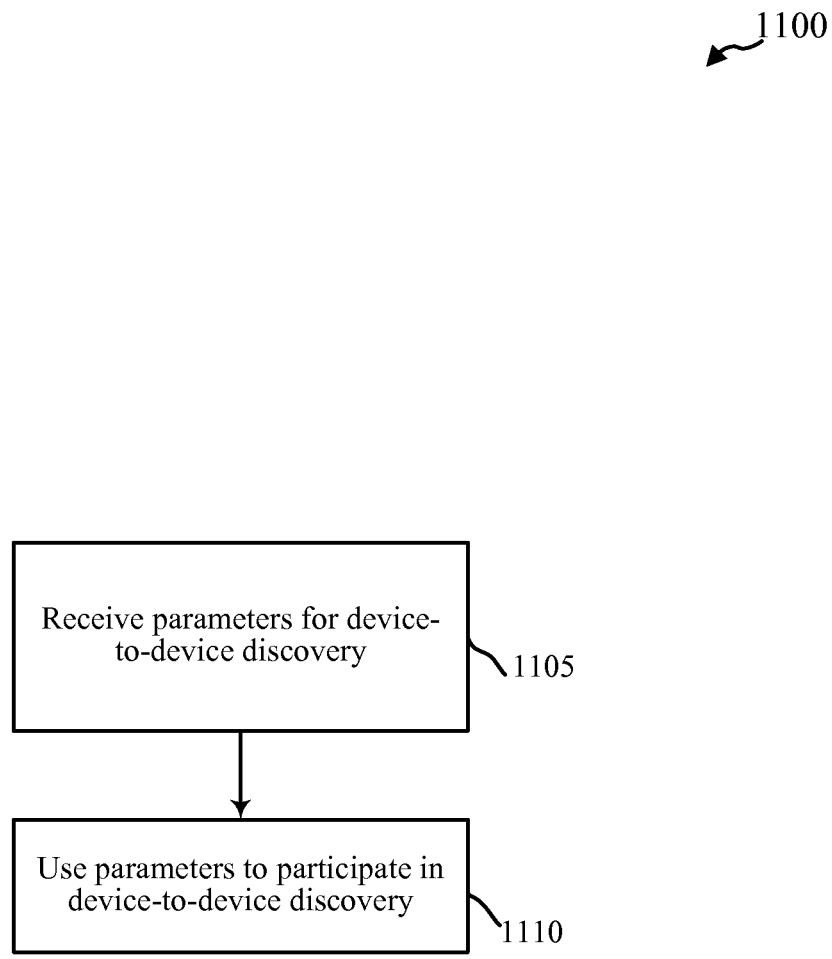
FIGS. 11-15 are flowcharts of various methods for wireless communications, in accordance with various embodiments.

FIG. 11 is a flow chart illustrating an example of a method 1100 for wireless communication, in accordance with various aspects of the present disclosure. For clarity, the method 1100 is described below with reference to aspects of one or more of the user devices 115 described with reference to FIGS. 1, 2, 4A, or 8, or aspects of one or more of the apparatuses 505 described with reference to FIG. 5, 6, or 7. In some examples, a user device such as one of the user devices 115 or an apparatus such as one of the apparatuses 505 may execute one or more sets of codes to control the functional elements of the user device or apparatus to perform the functions described below.

At block 1105, the method 1100 may include receiving parameters for D2D discovery. The received parameters may include a discovery period parameter 305, as described above. The received parameters may also include any one or more of the other discovery parameters described above. Namely, the received parameters may include any one or more of the following: a discovery period parameter 305, an SFN extension parameter 310, a discovery offset parameter 315, a discovery subframes parameter 320, a discovery RB length parameter 325, a discovery RB start and end point parameters 330, a modulation and coding parameter 335, a position of synchronization signal parameter 340, a transmission power parameter 345, an allowed mode of operation parameter 350, a common or dedicated discovery resources parameter 355, a transmission resource selection method parameter 360, a DMRS usable cyclic shifts parameter 365, a system time parameter, and parameters related to the duration that dedicated resources may be assigned. Other discovery-related parameters may be received as well.

At block 1110, the method 1100 may include using the received parameters to participate in D2D discovery. The received parameters may be used by, for example, a user device in order to use discovery resources.

In some embodiments, the operations at blocks 1105 or 1110 may be performed using the peer discovery module 515 described with reference to FIG. 5, 6, 7, or 8.

Therefore, the method 1100 may be used for wireless communications. It should be noted that the method 1100 is just one implementation and that the operations of the method 1100 may be rearranged or otherwise modified such that other implementations are possible.

Figure 12:
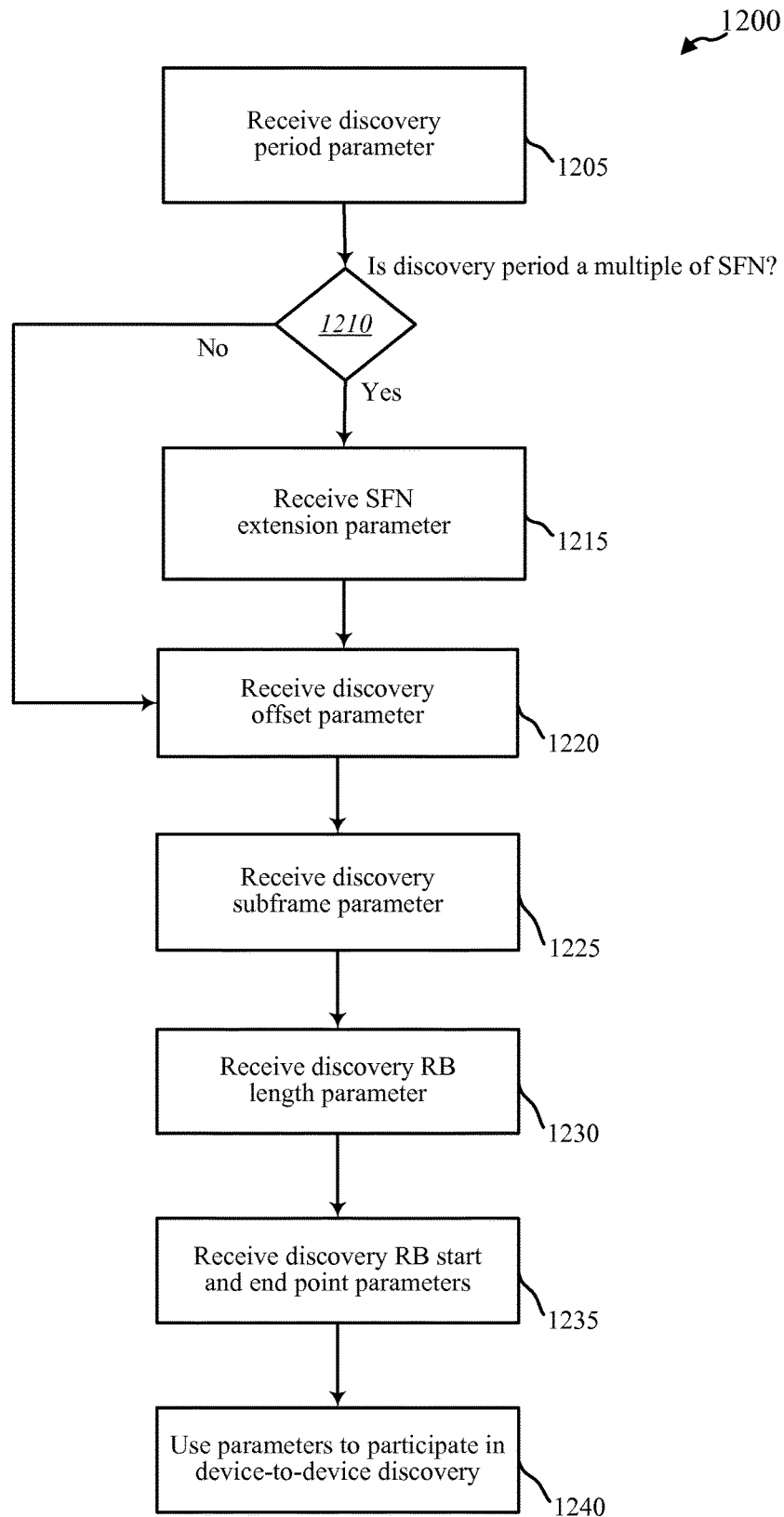

FIG. 12 is a flow chart illustrating an example of a method 1200 for wireless communication, in accordance with various aspects of the present disclosure. For clarity, the method 1200 is described below with reference to aspects of one or more of the user devices 115 described with reference to FIGS. 1, 2, 4A, or 8, or aspects of one or more of the apparatuses 505 described with reference to FIG. 5, 6, or 7. In some examples, a user device such as one of the user devices 115 or an apparatus such as one of the apparatuses 505 may execute one or more sets of codes to control the functional elements of the user device or apparatus to perform the functions described below.

At block 1205, the method 1200 may include receiving a discovery period parameter 305. The received discovery period parameter 305 identifies a discovery period in which discovery resources are available for D2D discovery. The received discovery period parameter 305 may also identify multiple discovery periods available for D2D discovery.

At block 1210, if a received discovery period is a multiple of SFN, then the method 1200 may receive, at block 1215, an SFN extension parameter 310. The SFN extension parameter 310 may indicate a number of times the maximum SFN is exceeded during the received discovery period. If the received discovery period is not a multiple of SFN, then the method 1200 may not require any receipt of an SFN extension parameter 310.

At block 1220, the method 1200 may include receiving a discovery offset parameter 315. The discovery offset parameter 315 may indicate an offset between a start of the discovery period and a fixed time-based reference point. As an example, the fixed time-based reference point may be when SFN and any extended SFN both equal zero. In some examples, the discovery offset parameter may indicate an offset between the start of the discovery period and the fixed time-based reference point for both transmission and reception pools. In some examples, a neighbor reception pool offset may also be indicated with respect to a fixed reference point of a serving cell of the user device or apparatus.

At block 1225, the method 1200 may include receiving a discovery subframe parameter. The discovery subframe parameter may indicate which subframes within the discovery period are available as discovery resources. The discovery subframe parameter may be in the form of one or more bit maps.

At block 1230, the method 1200 may include receiving a discovery RB length parameter 325. The discovery RB length parameter 325 may indicate a number of RBs to be used for each discovery signal within a subframe available as a discovery resource.

At block 1235, the method 1200 may include receiving discovery RB start and end point parameters 330. The discovery RB start and end point parameters 330 are used with the discovery RB length parameter 325 to indicate a start point and an end point of one or more resource blocks to be used for each discovery signal within a subframe available as a discovery resource.

At block 1240, the method 1200 may include using any one or more of the received parameters to participate in D2D discovery. The received parameters may be used by, for example, a user device in order to use discovery resources. While method 1200 can be followed as illustrated in FIG. 12, the order of receipt and types of parameters need not be limited to the specific order of receipt and types of parameters identified in FIG. 12. In other words, blocks 1205-1235 may occur in different orders, and not all of the parameters indicated by these blocks may be received before using any one or more of the received parameters occurs at block 1240.

In some embodiments, the operations at blocks 1205, 1210, 1215, 1220, 1225, 1230, 1235, or 1240 may be performed using the peer discovery module 515 described with reference to FIG. 5, 6, 7, or 8.

Therefore, the method 1200 may be used for wireless communications. It should be noted that the method 1200 is just one implementation and that the operations of the method 1200 may be rearranged or otherwise modified such that other implementations are possible.

Figure 13:
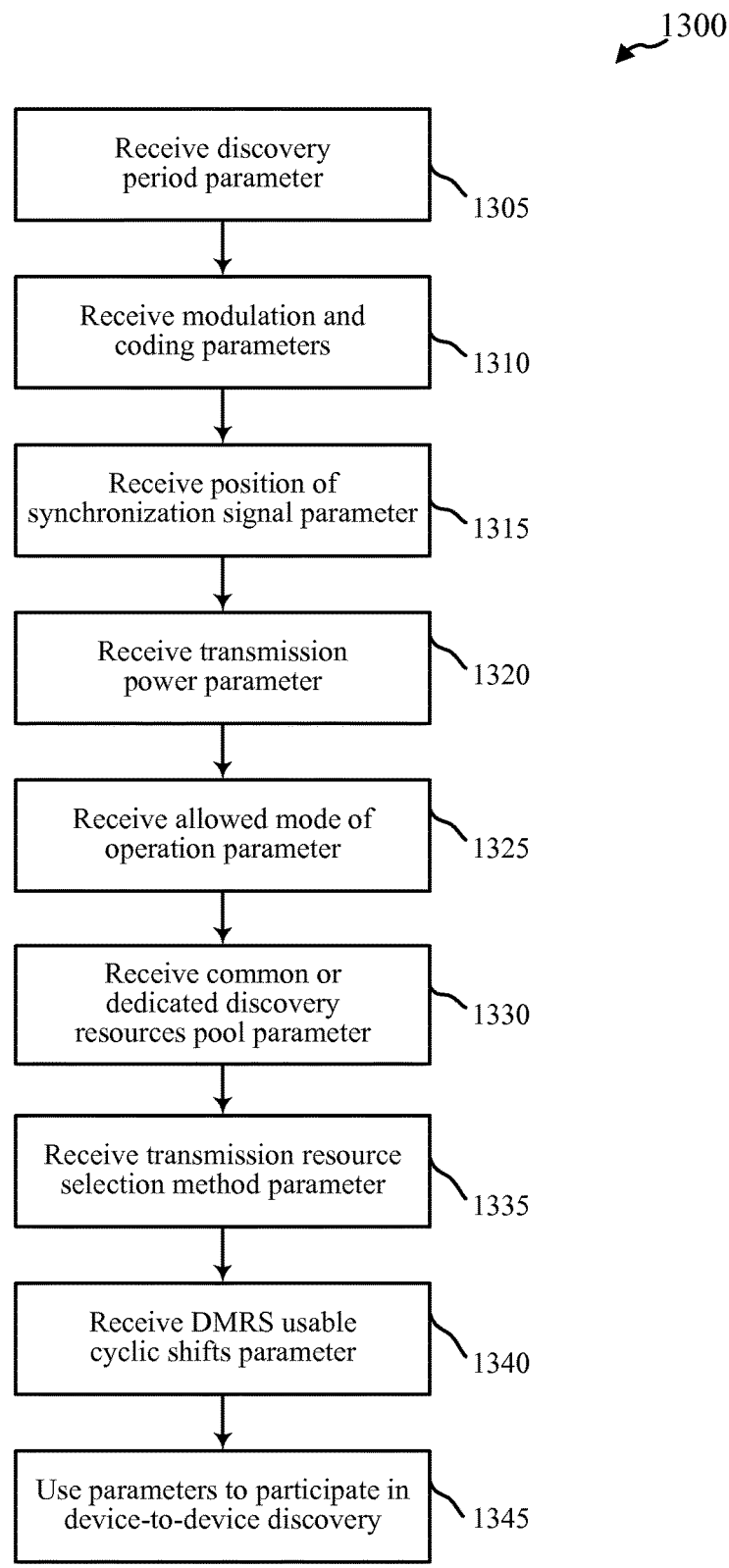

FIG. 13 is a flow chart illustrating an example of a method 1300 for wireless communication, in accordance with various aspects of the present disclosure. For clarity, the method 1300 is described below with reference to aspects of one or more of the user devices 115 described with reference to FIG. 1, 2, 4A, or 8, or aspects of one or more of the apparatuses 505 described with reference to FIG. 5, 6, or 7. In some examples, a user device such as one of the user devices 115 or an apparatus such as one of the apparatuses 505 may execute one or more sets of codes to control the functional elements of the user device or apparatus to perform the functions described below.

At block 1305, the method 1300 may include receiving a discovery period parameter 305. The received discovery period parameter 305 identifies a discovery period in which discovery resources are available for D2D discovery. The received discovery period parameter 305 may also identify multiple discovery periods available for D2D discovery.

At block 1310, the method 1300 may include receiving modulation and coding parameters 335. The modulation and coding parameters 335 may indicate a modulation and coding scheme for discovery signal transmission.

At block 1315, the method 1300 may include receiving a position of synchronization signal parameter 340. The position of synchronization signal parameter 340 may indicate a position of a synchronization signal of a neighbor base station as that synchronization signal is forwarded by user devices of the neighbor base station. Thus, the synchronization signal parameter 340 enables a user device to receive the synchronization signal as it is forwarded by another user device.

At block 1320, the method 1300 may include receiving a transmission power parameter 345. The transmission power parameter 345 may indicate a power level for discovery signal transmission. The available discovery resources may be partitioned into different power zones. When this is the case, the transmission power parameter 345 may be used to indicate in which power zone a particular discovery resource is located. The transmission power parameter 345 may be in the form of a bit map.

At block 1325, the method 1300 may include receiving an allowed mode of operation parameter 350. The allowed mode of operation parameter 350 may indicate whether discovery can occur during a connected mode or during an idle mode of the user device.

At block 1330, the method 1300 may include receiving a common or dedicated discovery resources pool parameter 355. The available discovery resources may be either common or may be dedicated for the use of a specific user device. The common resources pool parameter or dedicated discovery resources pool parameter may indicate whether available discovery resources are either common or are assigned as dedicated resources. The common or dedicated discovery resources pool parameter 335 may be in the form of one or more bit maps. Only one bit map is required when the discovery resources are frequency-domain multiplexed; two bit maps may be used when the discovery resources are time-domain multiplexed. In one example, the common discovery resource pool parameter may be a first bit map indicating common discovery resources and the dedicated discovery resource pool parameter is a second bit map indicating dedicated discovery resources when the discovery resources are time-domain multiplexed.

At block 1335, the method 1300 may include receiving a transmission resource selection method parameter 360. The transmission resource selection method parameter 360 may indicate a method to be used by the user device for selecting which of the available discovery resources is to be used for discovery signal transmission.

At block 1340, the method 1300 may include receiving a DMRS usable cyclic shifts parameter 365. The DMRS usable cyclic shifts parameter 365 may indicate which DMRS cyclic shifts are available and the time-varying pattern of DMRS cyclic shifts.

At block 1345, the method 1300 may include using any one or more of the received parameters to participate in D2D discovery. The received parameters may be used by, for example, a user device in order to use discovery resources. While method 1300 can be followed as illustrated in FIG. 13, the order of receipt and types of parameters need not be limited to the specific order of receipt and types of parameters identified in FIG. 13. In other words, blocks 1305-1340 may occur in different orders, and not all of the parameters indicated by these blocks may be received before using any one or more of the received parameters occurs at block 1345.

In further examples of the method 1300, the user device may receive some or all of the plurality of parameters on different frequencies in a system broadcast message. In further examples, the user device may receive some or all of the plurality of parameters for different public land mobile networks in a system broadcast message In some embodiments, the operations at blocks 1305, 1310, 1315, 1320, 1325, 1330, 1335, or 1340 may be performed using the peer discovery module 515 described with reference to FIG. 5, 6, 7, or 8.

Therefore, the method 1300 may be used for wireless communications. It should be noted that the method 1300 is just one implementation and that the operations of the method 1300 may be rearranged or otherwise modified such that other implementations are possible.

Figure 14:
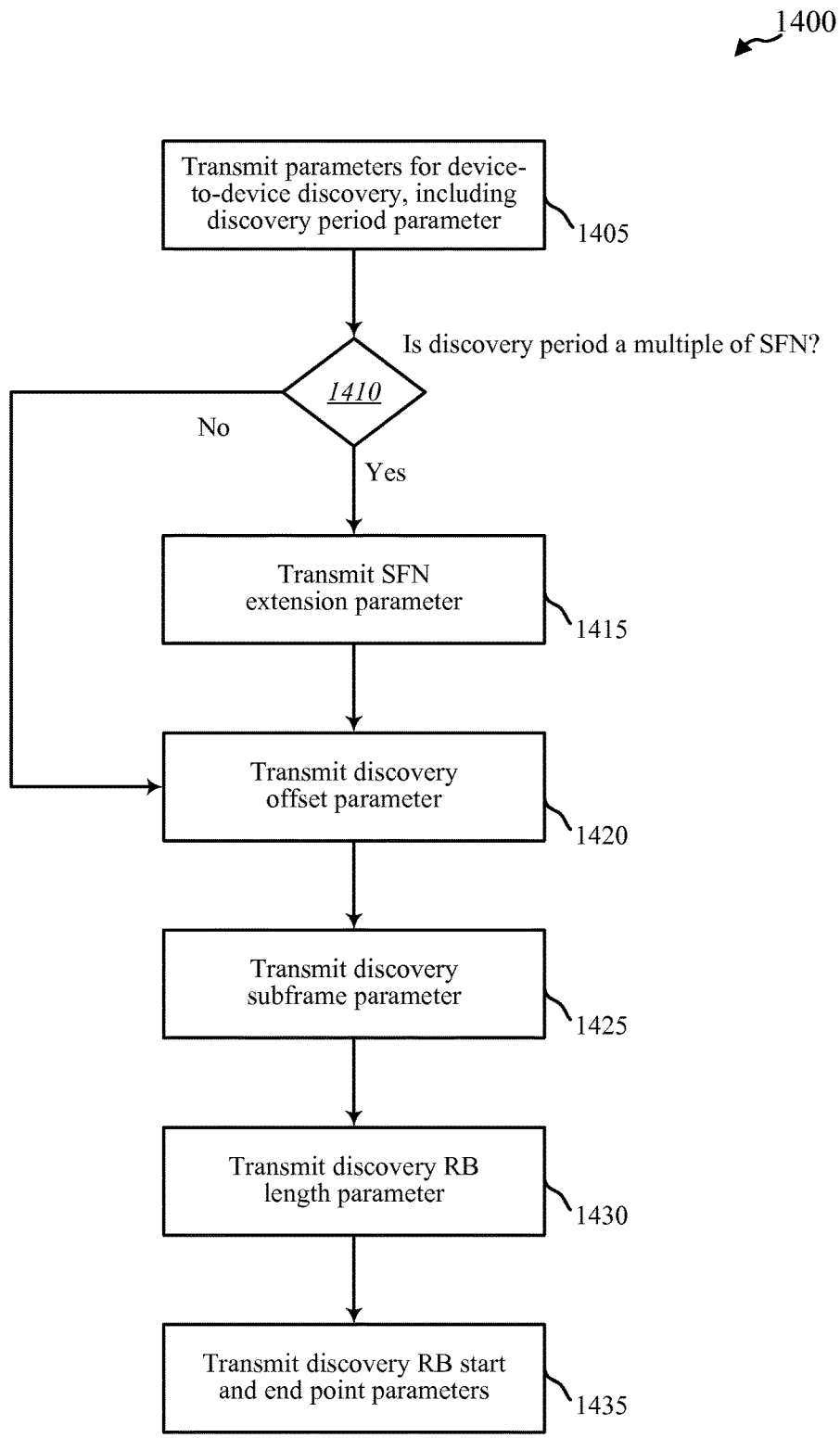

FIG. 14 is a flow chart illustrating an example of a method 1400 for wireless communications, in accordance with various aspects of the present disclosure. For clarity, the method 1400 is described below with reference to aspects of one or more of the base stations 105 described with reference to FIG. 1, 2, or 4A, or aspects of one or more of the apparatuses 905 described with reference to FIG. 9 or 10. In some examples, a base station such as one of the base stations 105 or an apparatus such as one of the apparatuses 905 may execute one or more sets of codes to control the functional elements of the base station or apparatus to perform the functions described below.

At block 1405, the method 1400 may include transmitting a discovery period parameter 305. The transmitted discovery period parameter 305 identifies a discovery period in which discovery resources are available for D2D discovery. The transmitted discovery period parameter 305 may also identify multiple discovery periods available for D2D discovery.

At block 1410, if a transmitted discovery period is a multiple of SFN, then the method 1400 may transmit, at block 1415, an SFN extension parameter 310. The SFN extension parameter 310 may indicate a number of times the maximum SFN is exceeded during the transmitted discovery period. If the transmitted discovery period is not a multiple of SFN, then the method 1400 may not require any transmission of an SFN extension parameter 310.

At block 1420, the method 1400 may include transmitting a discovery offset parameter 315. The discovery offset parameter 315 may indicate an offset between a start of the discovery period and a fixed time-based reference point. As an example, the fixed time-based reference point may be when SFN and any extended SFN both equal zero. In some examples, the discovery offset parameter may indicate an offset between the start of the discovery period and the fixed time-based reference point for both transmission and reception pools. In some examples, a neighbor reception pool offset may also be indicated with respect to the fixed reference point of a serving cell.

At block 1425, the method 1400 may include transmitting a discovery subframe parameter. The discovery subframe parameter may indicate which subframes within the discovery period are available as discovery resources. The discovery subframe parameter may be in the form of one or more bit maps.

At block 1430, the method 1400 may include transmitting a discovery RB length parameter 325. The discovery RB length parameter 325 may indicate a number of RBs to be used for each discovery signal within a subframe available as a discovery resource.

At block 1435, the method 1400 may include transmitting discovery RB start and end point parameters 330. The discovery RB start and end point parameters 330 may be used with the discovery RB length parameter 325 to indicate a start point and an end point of the RBs to be used for each discovery signal within a subframe available as a discovery resource.

While method 1400 can be followed as illustrated in FIG. 14, the order of transmission and types of parameters need not be limited to the specific order of transmission and types of parameters identified in FIG. 14. In other words, blocks 1405-1430 may occur in different orders, and not all of the parameters indicated by these blocks may be transmitted before the step of using any one or more of the transmitted parameters occurs.

In some embodiments, the operations at blocks 1405, 1410, 1415, 1420, 1425, 1430, or 1435 may be performed using the discovery parameter assignment module 910 described with reference to FIG. 9 or 10.

Therefore, the method 1400 may be used for wireless communications. It should be noted that the method 1400 is just one implementation and that the operations of the method 1400 may be rearranged or otherwise modified such that other implementations are possible.

Figure 15:
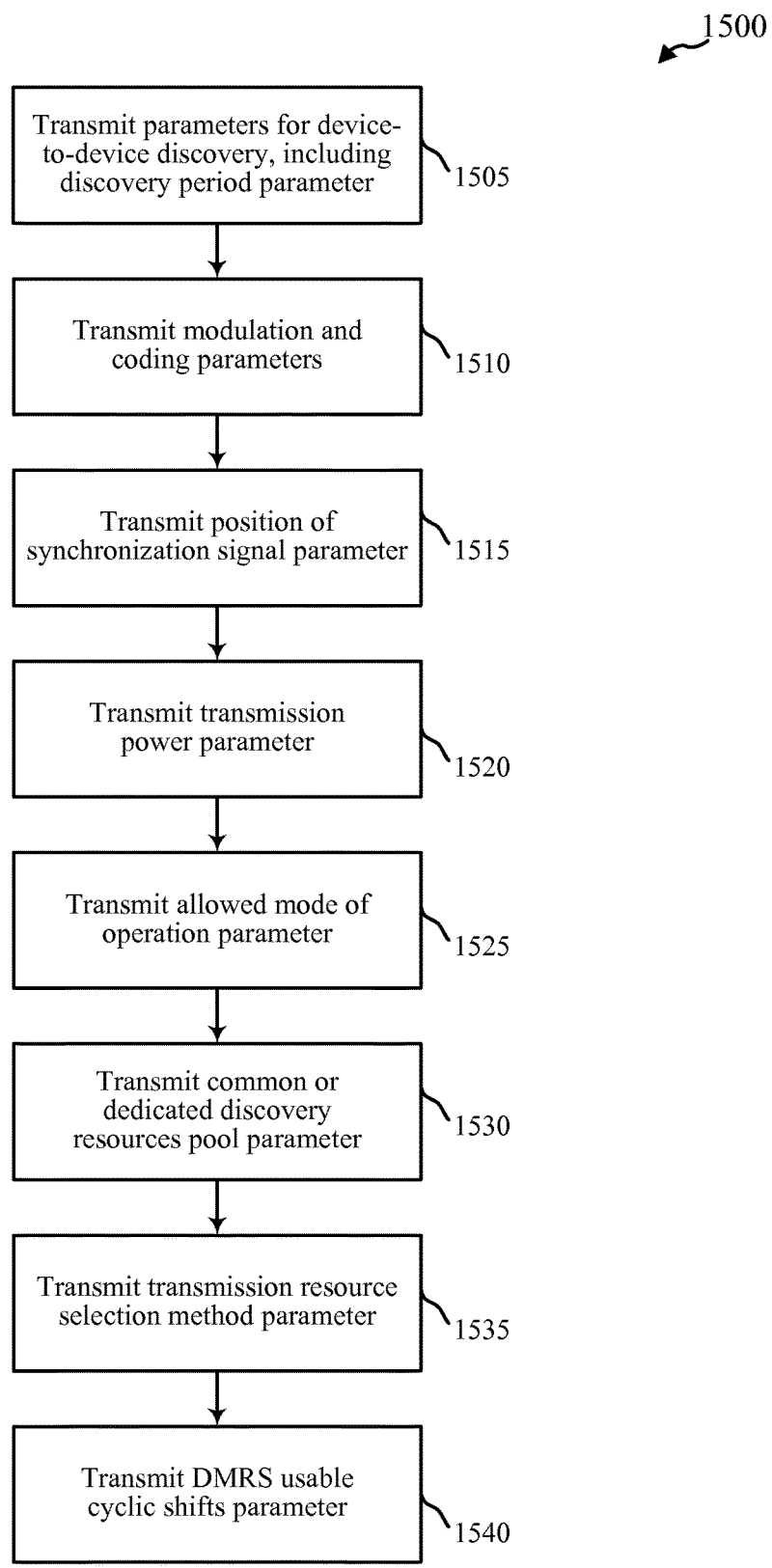

FIG. 15 is a flow chart illustrating an example of a method 1500 for wireless communications, in accordance with various aspects of the present disclosure. For clarity, the method 1500 is described below with reference to aspects of one or more of the base stations 105 described with reference to FIG. 1, 2, or 4A, or aspects of one or more of the apparatuses 905 described with reference to FIG. 9 or 10. In some examples, a base station such as one of the base stations 105 or an apparatus such as one of the apparatuses 905 may execute one or more sets of codes to control the functional elements of the base station or apparatus to perform the functions described below.

At block 1505, the method 1500 may include transmitting a discovery period parameter 305. The transmitted discovery period parameter 305 identifies a discovery period in which discovery resources are available for D2D discovery. The transmitted discovery period parameter 305 may also identify multiple discovery periods available for D2D discovery.

At block 1510, the method 1500 may include transmitting modulation and coding parameters 335. The modulation and coding parameters 335 may indicate a modulation and coding scheme for discovery signal transmission.

At block 1515, the method 1500 may include transmitting a position of synchronization signal parameter 340. The position of synchronization signal parameter 340 may indicate a position of a synchronization signal of a neighbor base station as that synchronization signal is forwarded by user devices of the neighbor base station. Thus, the parameter enables a user device to receive the synchronization signal as it is forwarded by another user device.

At block 1520, the method 1500 may include transmitting a transmission power parameter 345. The transmission power parameter 345 may indicate a power level for discovery signal transmission. The available discovery resources may be partitioned into different power zones. When this is the case, the transmission power parameter 345 may be used to indicate in which power zone a particular discovery resource is located. The transmission power parameter 345 may be in the form of a bit map.

At block 1525, the method 1500 may include transmitting an allowed mode of operation parameter 350. The allowed mode of operation parameter 350 may indicate whether discovery can occur during a connected mode or during an idle mode of the user device.

At block 1530, the method 1500 may include transmitting a common or dedicated discovery resources pool parameter 355. The available discovery resources may be either common or may be dedicated for the use of a specific user device. The common or dedicated discovery resources pool parameter 355 indicates whether available discovery resources are either common or are assigned as dedicated resources. The common or dedicated discovery resources pool parameter 355 may be in the form of one or more bit maps. Only one bit map is required when the discovery resources are frequency-domain multiplexed; two bit maps may be used when the discovery resources are time-domain multiplexed.

At block 1535, the method 1500 may include transmitting a transmission resource selection method parameter 360. The transmission resource selection method parameter 360 may indicate a method to be used by a user device for selecting which of the available discovery resources is to be used for discovery signal transmission.

At block 1540, the method 1500 may include transmitting a DMRS usable cyclic shifts parameter 365. The DMRS usable cyclic shifts parameter 365 may indicate which DMRS cyclic shifts are available and the time-varying pattern of DMRS cyclic shifts.

While method 1500 can be followed as illustrated in FIG. 15, the order of transmission and types of parameters need not be limited to the specific order of transmission and types of parameters identified in FIG. 15. In other words, blocks 1505-1540 may occur in different orders, and not all of the parameters indicated by these blocks may be transmitted before the step of using any one or more of the transmitted parameters occurs. In further examples, only a subset of the parameters shown in FIG. 15 may be transmitted.

In some embodiments, the operations at blocks 1505, 1510, 1515, 1520, 1525, 1530, 1535, or 1540 may be performed using the discovery parameter assignment module 910 described with reference to FIG. 9 or 10.

Therefore, the method 1500 may be used for wireless communications. It should be noted that the method 1500 is just one implementation and that the operations of the method 1500 may be rearranged or otherwise modified such that other implementations are possible.

The detailed description set forth above in connection with the appended drawings describes example embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a DSP, an (ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
  receiving at a user device a plurality of parameters for device-to-device discovery, the plurality of parameters including a discovery period parameter identifying a discovery period in which discovery resources are available for device-to-device discovery, wherein the discovery period is a fraction or a multiple of a maximum system frame number (SFN) of a network in which the user device is used; and
  using the plurality of parameters in order to participate in discovery with other user devices.

2. The method of claim 1, wherein when the discovery period is a multiple of a maximum SFN, the plurality of parameters further includes an SFN extension parameter to indicate a number of times the maximum SFN is exceeded during the discovery period.

3. The method of claim 1, wherein the plurality of parameters further comprises a discovery offset parameter indicating an offset between a start of the discovery period and a fixed time-based reference point for both of a transmission pool and a reception pool, the method further comprising:
  indicating a neighbor cell reception pool with respect to a fixed-based reference point for a serving cell of the user device.

4. The method of claim 1, wherein the plurality of parameters further includes a discovery subframes parameter indicating which subframes within the discovery period are available as discovery resources.

5. The method of claim 4, wherein the discovery subframes parameter is a bit map.

6. The method of claim 4, wherein the plurality of parameters further includes discovery resource block start and end point parameters indicating a start point and an end point of one or more resource blocks to be used for each discovery signal within a subframe available as a discovery resource.

7. The method of claim 1, wherein the plurality of parameters further includes a position of synchronization signal parameter indicating a position of a synchronization signal of a base station as forwarded each discovery period by one or more user devices connected to the base station.

8. The method of claim 1, wherein the plurality of parameters further includes a transmission power parameter indicating a power level for discovery signal transmission.

9. The method of claim 8, wherein the transmission power parameter can be a plurality of transmission power parameters when resources used for discovery are partitioned into different power zones, each of the plurality of transmission power parameters being associated with a corresponding power zone and having an associated bit map indicating subframes used for discovery signal transmission at the respective power level.

10. The method of claim 1, wherein the plurality of parameters further includes an allowed mode of operation parameter indicating whether discovery can occur during a connected mode or an idle mode.

11. The method of claim 1, wherein the plurality of parameters further includes a common discovery resource pool parameter or a dedicated discovery resource pool parameter indicating whether discovery resources are common to user devices or whether discovery resources are dedicated to specific user devices.

12. The method of claim 11, wherein the common discovery resource pool parameter is a first bit map indicating common discovery resources and the dedicated discovery resource pool parameter is a second bit map indicating dedicated discovery resources when the discovery resources are time-domain multiplexed (TDM).

13. The method of claim 1, wherein the plurality of parameters further includes a transmission resource selection method parameter indicating a method to be used by the user device for selecting which of the available discovery resources is to be used for discovery signal transmission.

14. The method of claim 1, wherein some of the plurality of parameters are different based on a class of the user device.

15. The method of claim 14, wherein the plurality of parameters includes two or more of a system frame number (SFN) extension parameter, a discovery offset parameter, a discovery subframes parameter, a discovery resource block length parameter, discovery resource block start and end point parameters, modulation and coding parameters, a position of synchronization signal parameter, a transmission power parameter, an allowed mode of operation parameter, a common discovery resource pool parameter, and a dedicated discovery resource pool parameter,
wherein the class of the user device is one of commercial or public safety.

16. The method of claim 1, wherein receiving the plurality of parameters further comprises receiving some of the plurality of parameters on different frequencies in a system broadcast message.

17. The method of claim 1, wherein receiving the plurality of parameters further comprises receiving the plurality of parameters for different public land mobile networks (PLMNs) in a system broadcast message.

18. An apparatus for wireless communication, comprising:
means for receiving at a user device a plurality of parameters for device-to-device discovery, the plurality of parameters including a discovery period parameter identifying a discovery period in which discovery resources are available for device-to-device discovery, wherein the discovery period is a fraction or a multiple of a maximum system frame number (SFN) of a network in which the user device is used; and
means for using the plurality of parameters in order to participate in discovery with other user devices.

19. The apparatus of claim 18, wherein the means for receiving includes means for receiving a system frame number (SFN) extension parameter to indicate a number of times a maximum SFN is exceeded during the discovery period.

20. The apparatus of claim 18, wherein the means for receiving includes means for receiving a discovery offset parameter indicating an offset between a start of the discovery period and a fixed time-based reference point for both of a transmission pool and a reception pool, the apparatus further comprising:
means for indicating a neighbor cell reception pool with respect to a fixed-based reference point for a serving cell of the user device.

21. The apparatus of claim 18, wherein the means for receiving includes means for receiving a discovery subframes parameter indicating which subframes within the discovery period are available as discovery resources.

22. The apparatus of claim 21, wherein the plurality of parameters further includes discovery resource block start and end point parameters indicating a start point and an end point of one or more resource blocks to be used for each discovery signal within a subframe available as a discovery resource.

23. The apparatus of claim 18, wherein the plurality of parameters further includes a transmission power parameter indicating a power level for discovery signal transmission, wherein the transmission power parameter can be a plurality of transmission power parameters when resources used for discovery are partitioned into different power zones, each of the plurality of transmission power parameters being associated with a corresponding power zone and having an associated bit map indicating subframes used for discovery signal transmission at the respective power level.

24. An apparatus configured for wireless communication, comprising:
at least one processor; and
a memory coupled to the at least one processor, wherein the at least one processor is configured:
to receive at a user device a plurality of parameters for device-to-device discovery, the plurality of parameters including a discovery period parameter identifying a discovery period in which discovery resources are available for device-to-device discovery, wherein the discovery period is a fraction or a multiple of a maximum system frame number (SFN) of a network in which the user device is used; and
to use the plurality of parameters in order to participate in discovery with other user devices.

25. The apparatus of claim 24, wherein the processor is further configured to receive a system frame number (SFN) extension parameter to indicate a number of times a maximum SFN is exceeded during the discovery period.

26. The apparatus of claim 24, wherein the processor is further configured to:
receive a discovery offset parameter indicating an offset between a start of the discovery period and a fixed time-based reference point for both of a transmission pool and a reception pool; and
indicate a neighbor cell reception pool with respect to a fixed-based reference point for a serving cell of the user device.

27. The apparatus of claim 24, wherein the processor is further configured to receive a discovery subframes parameter indicating which subframes within the discovery period are available as discovery resources.

28. The apparatus of claim 27, wherein the processor is further configured to receive discovery resource block start and end point parameters indicating a start point and an end point of the one or more resource blocks to be used for each discovery signal within a subframe available as a discovery resource.

29. A computer program product, comprising:
a non-transitory computer-readable medium having non-transitory program code recorded thereon, the non-transitory program code comprising:
program code to receive at a user device a plurality of parameters for device-to-device discovery, the plurality of parameters including a discovery period parameter identifying a discovery period in which discovery resources are available for device-to-device discovery, wherein the discovery period is a fraction or a multiple of a maximum system frame number (SFN) of a network in which the user device is used; and
program code to use the plurality of parameters in order to participate in discovery with other user devices.

* * * * *